United States Patent [19]

Oshima et al.

[11] Patent Number: 5,375,125
[45] Date of Patent: Dec. 20, 1994

[54] METHOD OF DISPLAYING PROGRAM EXECUTION FOR A COMPUTER

[75] Inventors: Yoshimitsu Oshima, Tokyo; Toshihisa Aoshima, Hamura, both of Japan

[73] Assignee: Hitachi, Ltd., Tokyo, Japan

[21] Appl. No.: 882,471

[22] Filed: May 13, 1992

[30] Foreign Application Priority Data

May 15, 1991 [JP] Japan ................................. 3-110131

[51] Int. Cl.$^5$ .............................................. G06F 11/00
[52] U.S. Cl. .................................. 371/19; 364/267.91; 364/DIG. 1; 395/575
[58] Field of Search ................. 371/19, 16.5; 395/575; 364/267.91

[56] References Cited

U.S. PATENT DOCUMENTS

| | | | |
|---|---|---|---|
| 4,730,315 | 3/1988 | Saito et al. ............................. | 371/19 |
| 5,146,559 | 9/1992 | Orimo et al. ........................... | 395/200 |
| 5,165,036 | 11/1992 | Miyata et al. .......................... | 395/800 |
| 5,210,859 | 5/1993 | Aoshima et al. ...................... | 395/575 |
| 5,255,385 | 10/1993 | Kikuchi ................................. | 395/575 |

FOREIGN PATENT DOCUMENTS 2-210556 2/1990 Japan .

OTHER PUBLICATIONS

"Program Developing Environment of LISP/VM," Symbol Processing Study Group Report 31, Information Processing Engineer's Society, Mar. 1985, pp. 37–44. (Provided in Japanese).

"Development Idea and Functions of SEWB," Hitachi Review, vol. 70, No. 2, Feb., 1988, pp. 101–108. (Provided in Japanese).

*Primary Examiner*—Charles E. Atkinson
*Attorney, Agent, or Firm*—Fay, Sharpe, Beall, Fagan, Minnich & McKee

[57] ABSTRACT

The present invention relates to a method of displaying an execution status and an execution history of a program for a computer system, associated with a source program and a module relation diagram. The method of displaying program execution according to the present invention displays the processing results of each of execution units, execution statuses of an iteration, a conditional branch, a recursive call and so on superimposed on the source program displayed on a screen in the vicinity of the respective execution units. Information on execution status is also displayed corresponding to the module relation diagram. Further, a program execution history is preserved so as to allow a reproduced display thereof in the above-mentioned form by request.

24 Claims, 38 Drawing Sheets

FIG. 3

| COMMAND MENU | |
|---|---|
| EXECUTION HISTORY ACQUISITION | ON |
| | OFF |
| EXECUTION HISTORY LIMITED ACQUISITION MODE | |
| ERASURE OF EXECUTION DISPLAY WHEN THE PROCESSING TERMINATES | ON |
| | OFF |
| EXECUTION STATUS DISTINCTIVE DISPLAY | ON |
| | OFF |
| DYNAMICALLY UNFOLDING DISPLAY | ON |
| | OFF |
| RECURSIVE PILED-UP DISPLAY MODE | |
| RECURSIVE EXTENSION DISPLAY MODE | |
| BREAK POINT SET | |
| BREAK POINT RELEASE | |
| SELECTION OF OBJECT FOR EXECUTION HISTORY ACQUISITION | |
| RELEASE OF SELECTED OBJECT FOR EXECUTION HISTORY ACQUISITION | |
| EXECUTION HISTORY RETRIEVAL | |

~ 25

```
(defun func (a b c d)
    (+ (* a b)
       (/ c d) ) )
```

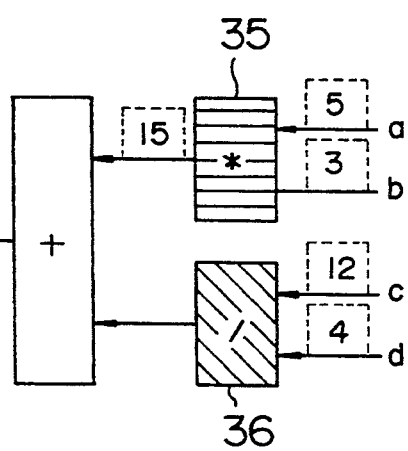

```
(defun factorial (n)
  (do ((i 1 (1+ i))
       (result 1))
      ((> i n) result)
    (setq result (* i result))))
```

```
(defun list-square (x)
   (mapcar
      #'(lambda(x) (* x x))
      list) ) )
```

```
(defun factorial (n)
    (if (= n 1)
        1
        (* n (factorial (1- n)))))
```

```
INTERACTIVE INPUT
>(func 5 3 12 4)
```

```
SOURCE PROGRAM (defun func (a[5] b[3] c[12] d[4])
             (+[15] (*[5] a[3] b)
                (/ c[12] d[4])))
           ↑
           └─260

[go]      [next]      [prev]      [last]
```

FIG. 32

```
INTERACTIVE INPUT
>(factorial 10)
```

```
SOURCE PROGRAM (defun factorial (n)
              5            4
       (do ((i  1   (1+  i))
               24
            (result  1))
            nil   5   10
           ((>  i   n) result)
                         5   24
           (setq result (*  i  result))))
                         ↑
                         ~270
```

[go] [next] [prev] [last]

FIG. 33

```
INTERACTIVE INPUT
>(list-square '(1 2 3 4 5 6 7 8))
```

```
SOURCE PROGRAM (defun list-square (x) (1 2 3 4 5 6 7 8)
        (1 4 9 16      )
    (mapcar
                        4   16  4   4
        #'(lambda (x)  (*   x   x))
        (1 2 3 4 5 6 7 8)
        list)))
```

[go]  [next]  [prev]  [last]

```
int factorial (n)          ....... 1
int n ;                    ....... 2
{                          ....... 3
    int i, result ;        ....... 4
    result = 1 ;           ....... 5
    for ( i = 1 ; i<= n ; i++)  ....... 6
            result = i * result ;  ....... 7
    return (result) ;      ....... 8
}                          ....... 9
```

METHOD OF DISPLAYING PROGRAM EXECUTION FOR A COMPUTER

BACKGROUND OF THE INVENTION

The present invention relates to a method of supporting program testing and debugging operations, and more particularly, to a method of successively displaying an execution history of a program under execution and the processing results thereof and a method of preserving, retrieving and displaying execution results.

Generally in a program debugging operation, a variety of methods and software tools are employed for verifying the behavior of a program, finding out the cause of an error, if one occurs, and so on.

As a means for supporting this debugging operation, there is conventionally known a step execution function for executing a program one step at a time to output the results of respective steps in order. This means is effective in understanding the behavior of a program and narrowing down bug occurring locations on the basis of the behavior information.

For further facilitating the understanding of an execution process of such a step execution, a method is known which specifically shows an executed location of a source program on the screen of a display so as to allow an execution process of the program to be monitored on the screen, as introduced by a literature entitled "Program Developing Environment of LISP/VM" (Symbol Processing Study Group Report 31, Information Processing Engineer's Society (March, 1985)).

Also, a literature entitled "Development Idea and Functions of SEWB" (Hitachi Review Vol. 70, No. 2 (February, 1988) describes a method for displaying a source program in a visual form, wherein a figure corresponding to each execution step of the program is specifically shown in a sequence manner as the program is running, while contents of variables associated with the shown program are displayed in an area separate from that of the program in conformity with the execution.

Alternatively, there is also a conventional method which previously (i.e., prior to program execution), inserts an execution statement for printing contents of execution in progress in a related portion of a program so as to print out information related to the execution in progress. Also, widely employed is a supporting method which sets a break point in a program for interrupting the execution thereof to re-execute the program such that related information is referenced and outputted when the program is stopped at the break point. Further, a method is implemented which specifies a trace and output of arguments and return values (results) of respective modules constituting a program and re-executes the program while tracing and outputting such related information.

To facilitate the above-mentioned operations, co-pending U.S. Patent application Ser. No. 507,391 filed on Apr. 10, 1990 proposed a method of preserving the progress of a program under execution (trace information) and retrieving and displaying such information. Specifically, this patent document describes a method of specifying an objective module to be traced utilizing a module relation diagram illustrating a program calling hierarchy; a method of specifying on a module relation diagram a module whose execution history is desired to be retrieved and displayed and displaying the execution history of the specified module; and a method of indicating variables commonly used in different modules to display a source program of a module referencing and modifying the variables and the position of the module on the module relation diagram. This document also describes a method of displaying a module relation diagram and source programs such that the currently executed location is displayed thereon, while data related to the execution is displayed in a separate area, as the execution of the program progresses.

On the other hand, for displaying an execution progress of a program itself, that is, the order of executing modules till a predetermined time (e.g., a time at which an error has occurred), there is known, for example, a back trace function in the LISP language or a function of displaying contents of a control stack at a certain time.

Further, U.S. Pat. No. 4,730,315 to Saitot discloses a simultaneous display of a program together with related variables on the same screen.

Japanese Patent Application Laid-open No. JP-A-2-210556 discloses a visualization apparatus for program execution.

SUMMARY OF THE INVENTION

In the above-mentioned systems, only an execution progress of a program is displayed in a visual manner, or even if contents of variables related to the execution can be displayed, they appear in a different area of the screen. Even if information on a past execution history (trace) can be referenced, it is displayed in an area separate from a program and a module relation diagram. A structural display of trace information, though possible, also appears in a separate area. Thus, for understanding an execution progress of a program, it is not always easy to correlate a program to information related to the execution thereof. For this reason, even though related data is displayed, a user must understand in his or her own thoughts the structural relationship (dependency, order, hierarchical relationship and so on), which results in imposing on the user excessive burden on the brain.

On the other hand, as to a display of an execution progress, the back trace function simply displays contents of a control stack and is unable to display such data of an executed module which has been removed from the control stack because information on an execution progress of the executed module has not been left on the control stack.

Thus, it is an object of the present invention to provide a means for displaying a source program and a module relation diagram with information on an execution progress of the program superimposed thereon so as to help the user visually understand the structure of a program execution status in relation with the displayed information.

It is another object of the present invention to provide means for retrieving and displaying a previous execution history of a program by utilizing a module relation diagram and a source program.

To achieve the above object, as a first method, a source program of a module and a module relation diagram are first generated and displayed. A module relation diagram is a diagram which expresses relationships among modules constituting the program in a tree structure. Then, as the execution of a program advances, values resulting from the program processing such as related arguments, variables, return values of functions and so on are successively displayed in the vicinity of execution units such as functions, equations, execution statements and so on in the source program. Also, a display attribute indicating an execution status of each of the execution units such as functions, equations, execution statements and so on forms the source program, that is, indicating an executing, executed or suspended status is given to each execution unit on the displayed program, keeping pace with the advance of the program execution. Similarly, a display attribute indicating an executing, executed or suspended status of each of modules constituting a program is given to each module in a module relation diagram, keeping pace with the advance of the program execution. When a recursive call of a program or a dynamic call is executed, information indicating such a call is successively displayed superimposed on the module relation diagram.

To realize the above-mentioned execution display, data related to the display of a source program and a module relation diagram is internally prepared. Specifically, the data related to a display of a source program is comprised of a combination of data cells including such elements as the kind of each execution unit, a displayed position, a display size, a list of elements constituting the execution unit and so on. Display related data for the module relation diagram is comprised of a combination of data cells corresponding to the respective modules, and these data cells each have elements such as a module name, a displayed position, a display size, display related data for the source program, a list of lower modules called by a given module, and so on.

A program for controlling execution and display of an objective program, references the above-mentioned data, and displays the processing results of respective execution units and execution statuses of the respective execution units at predetermined positions on the source program and the module relation diagram, keeping pace with execution of the program.

The present invention also executes the following processings as a second method:

First, elements for holding values resulting from processings and information on execution statuses, an execution unit which has been immediately previously executed, and an execution unit to be next executed, are added to for the above-mentioned display related data of the respective execution units of the source program, and corresponding data is successively stored in these predetermined elements as the execution progresses. Likewise, elements for holding an execution status of the each module are prepared for each of modules in the module relation diagram, and corresponding data is successively stored in these elements as the execution progresses.

When execution of a program is interrupted, the above-mentioned stored data on the source program and the module relation diagram are displayed, by a request of the user, superimposed on related parts of the source program and the module relation diagram in a form similar to that of the execution display by the source program and the module relation diagram.

Also, in response to a user's selecting operation, information on an execution unit which has been immediately previously executed and an execution unit to be next executed, in the display related data corresponding to respective execution units of the source program is utilized to display an execution status one step before a currently displayed execution status and values of the processing results related thereto, and an execution status at the next step and values of the processing results related thereto in a similar form.

When a previously specified break point (a program interrupting point) is reached or an error occurs during execution of a program, values of the processing results and execution statuses of respective execution units at that time are displayed in a similar form by utilizing execution history data stored in the display related data elements for the respective execution units and the respective modules.

When an execution unit is an iteration, a simple call of a function or a subroutine, a recursive call of a function or a subroutine, a conditional branch, a dynamic call of a program, or a function, a subroutine or the like which receives, as an input, data including a plurality of elements such as an array, a list or the like and repeats the same processing for each constituent element, the following method is further used.

First, when an execution unit is an iteration, elements for holding information for each unit of the iteration are prepared for display related data of execution units related to the iteration. Then, each time a processing for one unit of the iteration is started, display related data of a partial program related to the iteration is copied and registered in the above-mentioned elements, and execution display data and execution status display data generated in each iteration are recorded in the newly copied display related data. Simultaneously, the newly generated and displayed data is displayed in a piled up manner superimposed on the iteration portion of the displayed source program.

When the execution of the iteration is being displayed by the above-mentioned method, values of the processing results and data indicating an execution status of an iteration arbitrarily specified by the user are superimposed on a partial program executing the iteration and displayed on the top of a piled-up display representing the iteration.

When an execution unit is a function or subroutine call, a called program is displayed in the middle of a displayed position of the execution unit or calling program.

When an execution unit is not a simple call of a subroutine or the like but a recursive call, elements for holding information for each unit of the recursive call are prepared for display related data of execution units related to the recursive call. Then, each time a processing of one unit of the recursive call is started, display related data of a called program module is copied and registered in the elements. Also, execution display data and execution status display data are recorded in the newly copied display related data. Simultaneously, the newly generated and recorded data is displayed in a piled-up manner on the displayed source program.

Similarly to the case of an iteration, when an execution display for a recursive call is performed by the above-mentioned method, values of the processing results and data indicating an execution status of a recursive call arbitrarily specified by the user are superimposed on the recursive program and displayed on the top of a piled-up display representing the recursive program.

As an alternative method for the case where an execution unit is a recursive call, elements for holding information on each unit of the recursive call are prepared for display related data of respective modules in a module relation diagram. Then, each time a processing of one unit of the recursive call is started, a partial module relation diagram including lower modules below a called module is copied and registered in the elements. Simultaneously, the copied partial module relation diagram is displayed in a piled-up manner at a corresponding position on the original module relation diagram.

Similarly to the case of a piled-up display of the source program, when an execution display of a recursive call is performed by the above-mentioned method, values resulting from the processing and data indicating an execution status of a recursive call arbitrarily specified by the user are displayed superimposed on a source program of a called module.

As a further method for the case where an execution unit is a recursive call or a dynamic call of a program, elements for holding information for each unit of the recursive call or the dynamic call of the program are prepared for display related data of respective modules in a module relation diagram. Then each time a processing of one unit of the recursive call or the dynamic call of the program is started, a partial module relation diagram including lower modules below a called module is generated and registered in the elements. Simultaneously, the generated partial module relation diagram is displayed as extending downward from a calling module on the original module relation diagram.

Similarly to the case of the piled-up display, values resulting from the processing and data indicating an execution status of a recursive call arbitrarily specified by the user on the module relation diagram superimposed on a source program of the module is displayed superimposed on a source program of a called module.

When an execution unit is a conditional branch, an execution unit to be next executed is distinctively displayed in accordance with the execution result of the conditional branch.

When an execution unit is a dynamic call of a program or a function or a subroutine (specifically, a function "map" of the LISP language, for example) which receives, as an input, data including a plurality of elements such as an array, list or the like, arguments are displayed as an array of the respective constituent elements at argument related positions of the function or the subroutine. Within these elements, an element of a given argument which is currently being executed is distinctively displayed. Each time each element has been processed, the processing result of the each element is displayed at a related position corresponding to the argument.

The first method enables data related to program execution such as the processing results and execution statuses of respective execution units of a program and constituent modules to be displayed superimposed on a source program and a module relation diagram, thus providing an integrated display which allows the user to monitor the program and its execution.

The second method preserves an execution history of a program and allows the user to arbitrarily select a related execution unit or a module on a source program and a module relation diagram to retrieve the selected execution history data and obtain a display in which the retrieved data is superimposed on the source program and the module relation diagram.

BRIEF DESCRIPTION OF THE DRAWINGS

FIG. 3 is a diagram showing in detail a command menu 25 in FIG. 1;

FIG. 7 is a diagram illustrating an example of a display which distinctively shows an execution unit in progress and an executed execution unit;

FIG. 2 is a flow diagram illustrating a processing flow of a "next" button;

FIG. 31 is a diagram illustrating an example of the program execution display method according to the present invention which is applied to a textually expressed program;

FIG. 32 is a diagram illustrating another example of the program execution display method according to the present invention which is applied to a textually expressed program.

FIG. 33 is a diagram illustrating a further example of the program execution display method according to the present invention which applied to a textually expressed program;

DESCRIPTION OF THE PREFERRED EMBODIMENTS

Embodiments of the present invention will hereinafter be described in detail with reference to the accompanying drawings. In the following embodiments a program expressed in a visual form will be explained as an example. It should be noted however that even if a program expressed in a textual form is used in each embodiment, a similar method can be realized.

A visual expression for a program used in the embodiment utilizes a method described in co-pending U.S. Patent application Ser. No. 665,563 filed on Mar. 6, 1991. The LISP language is used as a programming language which bases the visual expression. However, the present invention is not limited to the LISP language and the visual expression based thereon.

Figure 2:
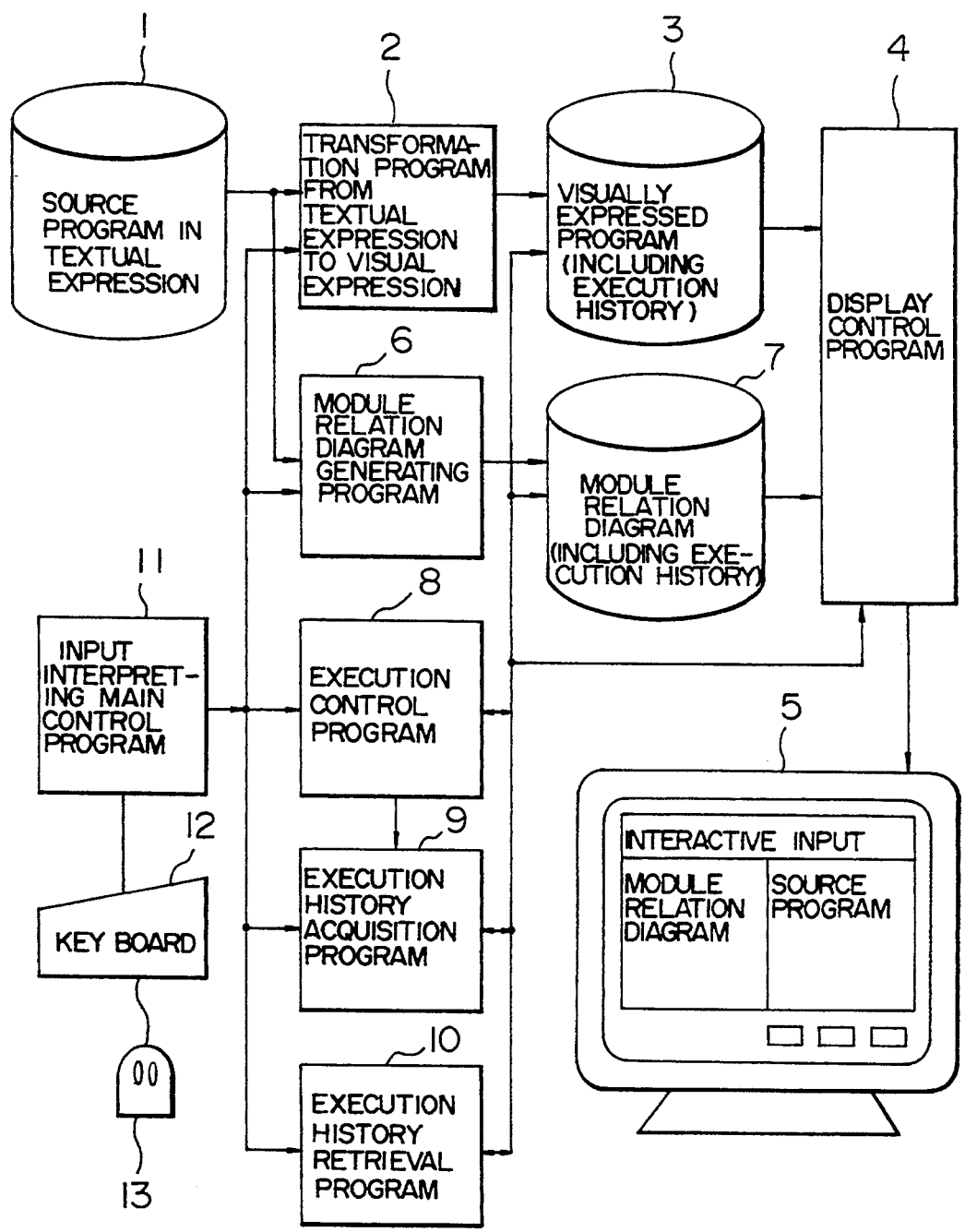
FIG. 2 as a block diagram illustrating the configuration of a system for implementing the present invention.

FIG. 2 illustrates the configuration of a system which realizes a method of displaying program execution according to the present invention.

In FIG. 2, reference numeral 1 designates a source program in textual expression created by a user. This source program 1 is transformed to (an internal expression of) a program 3 in visual expression by a transformation program 2, and the program 3 is displayed on the screen of a display unit 5 through a display control program 4.

Reference numeral 6 designates a program for generating a module relation diagram which analyzes a source program in textual expression, extracts a calling relationship among respective modules included in the source program, generates (internal expression data) on a module relation diagram 7, and displays the module relation diagram 7 on the screen 5 through the display control program 4.

Figure 22:
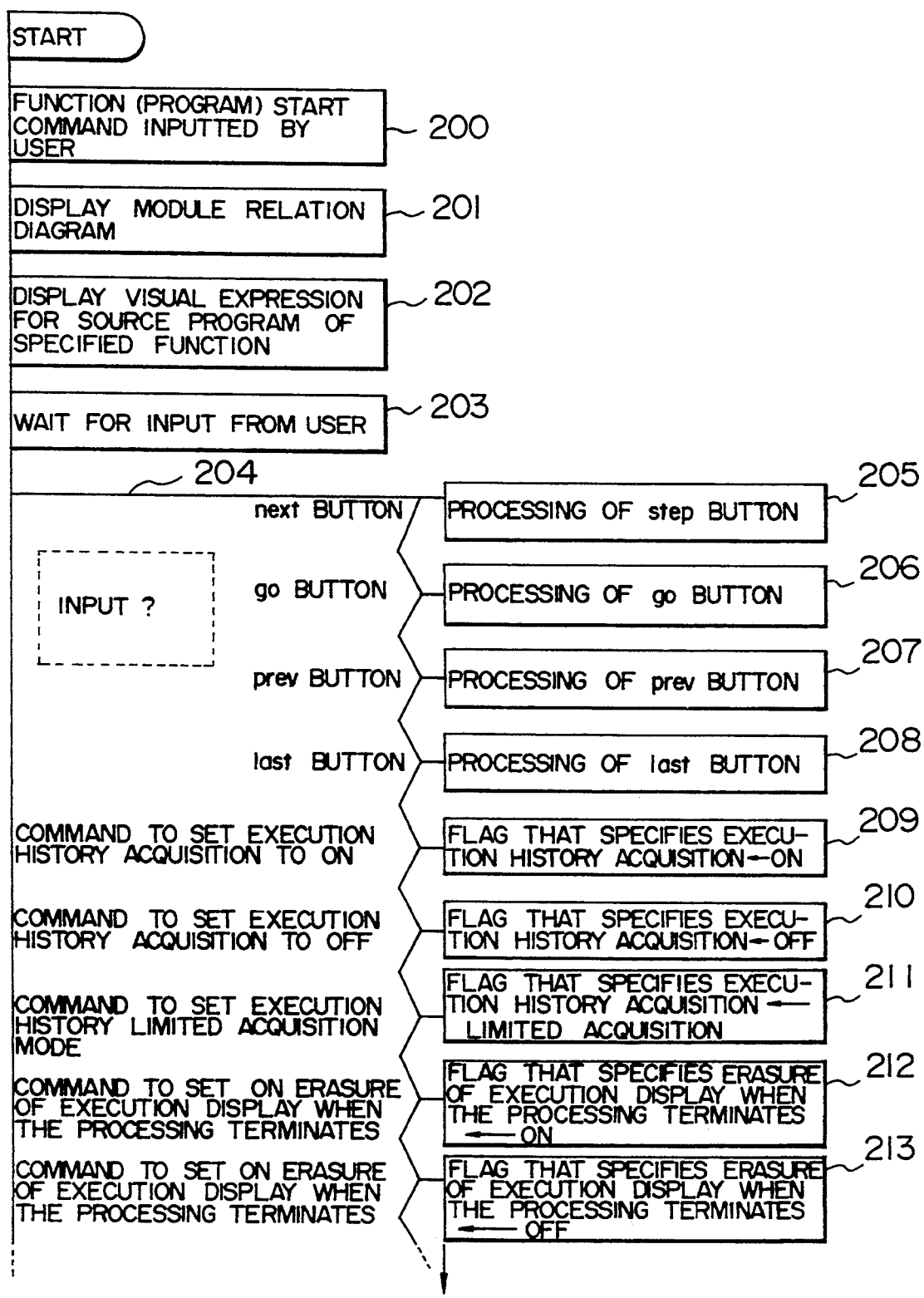
FIG. 22 is a flow diagram illustrating part of a processing flow of an input interpretation and main control program.

Reference numeral 8 designates an execution control program which interprets (the internal expression of) the program 3 in visual expression and executes necessary processings. It should be noted that a program for interpreting and executing a program in visual expression, as shown in FIG. 22 later referred to, on the basis of internal expression data thereof may be readily realized by using a technique of a conventional program for interpreting and executing a program in textual expression, that is, a so-called interpreter.

The execution control program 8 interprets and executes the program 3 in visual expression as well as, if execution history acquisition is instructed, requests an execution history acquisition program 9 to add a variety of history information generated in course of execution to (internal data of) the program 3 in visual expression and (internal data of) the module relation diagram 7. When a successive display of an execution progress is specified, the execution control program 8 also displays it on the screen 5 through the display control program 4.

Reference numeral 10 designates an execution history retrieval program which retrieves necessary history information requested by the user from (the internal data of) the program 3 in visual expression or (the internal data of) the module relation diagram 7 and displays the retrieved information on the screen of the display unit 5 through the display control program 4 after the completion of or in course of program execution.

Reference numeral 11 designates a main control program which interprets a command inputted from an input device such as a keyboard 12, a mouse 13 or the like and performs the entire control of a variety of the above mentioned programs including start, stop and so on.

Figure 1:
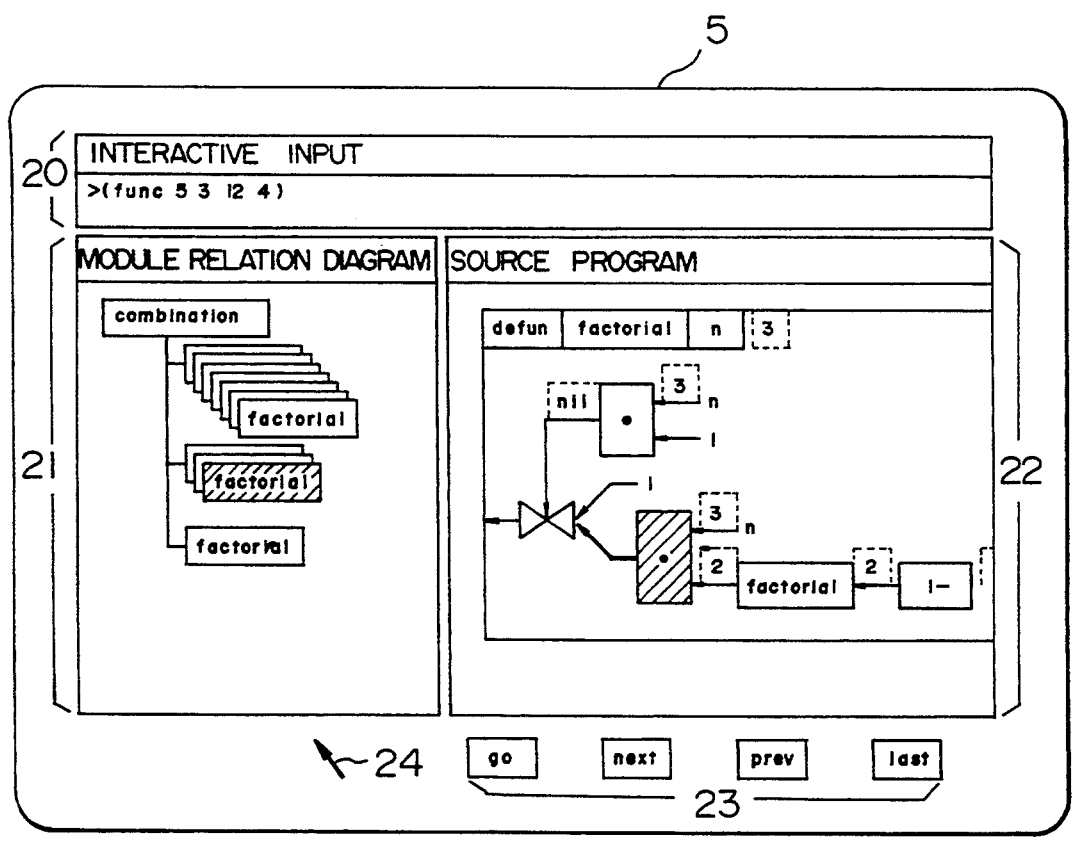
FIG. 1 is a diagram illustrating an example of a display showing program execution according to the present invention.

FIG. 1 is a diagram specifically illustrating an example of contents displayed on the screen of the display unit 5 shown in FIG. 2.

Reference numeral 20 in FIG. 1 designates an interactive input window for inputting a variety of commands in the form of text; 21 a window for displaying a module relation diagram; and 22 a window for displaying a source program in visual form. The windows 21 and 22 are used not only for displaying the module relation diagram and the source program in visual expression but also for superimposing program execution statuses thereon during execution of the program. Reference numeral 23 designates buttons for instructing a variety of displays and a control of program execution. When a mouse cursor 24 is placed on a button and a mouse is clicked, a processing corresponding to the clicked button is executed.

Referring now to FIG. 3, there is shown a command menu 25 which is superimposed on another display on the screen of FIG. 1 if necessary. The command menu 25 lists a variety of commands for various information display methods, a program execution control and so on. When one of these commands is selected by the mouse cursor 24 and the mouse is clicked, a processing corresponding to the selected command is executed. Processing of each command will be described later in detail when the internal processing is explained.

Next, a variety of methods for displaying program execution according to the present invention will be described using examples of specific displays on the screen.

Figures 4A, 4B:
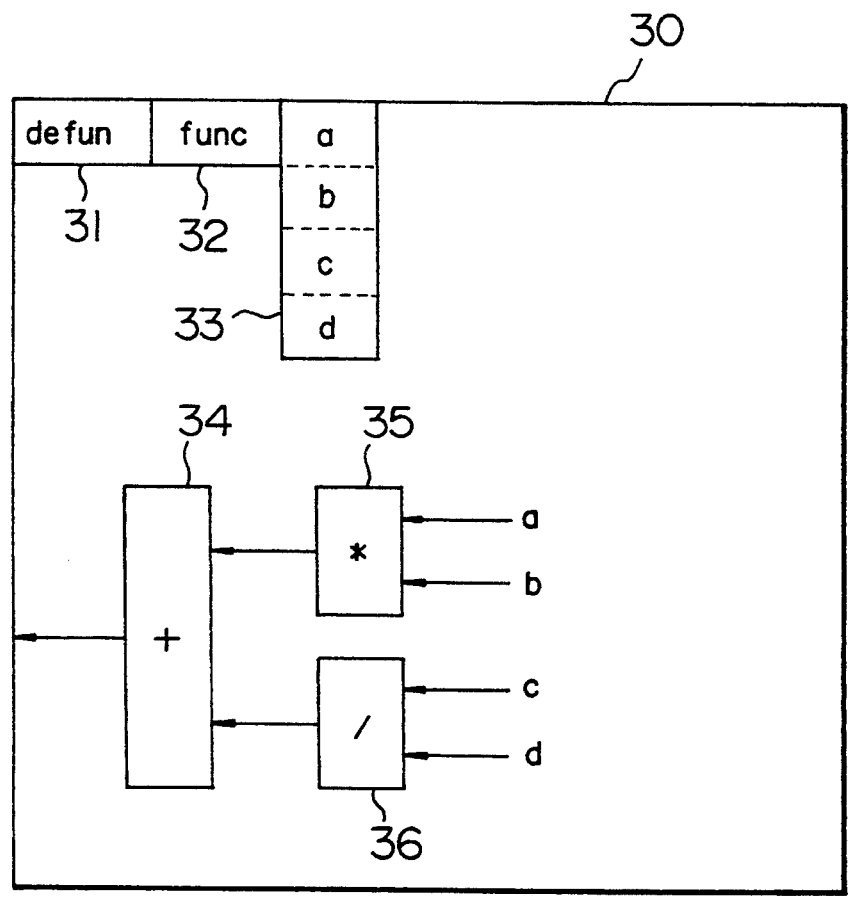
FIGS. 4A and 4B are diagrams illustrating an example of a program for explaining the basic operation of a program execution display according to the present invention.

FIG. 4B illustrates a LISP program shown in FIG. 4A in visual form. This is a program for calculating an expression a*b+c/d and returning the result.

In FIG. 4B, reference numeral 30 designates a frame which shows the definition of a function program "func". Along the upper side of the frame 30, there are shown from the left a key word "defun" (31) indicative of the function definition, the name of a function to be defined "func" (32), and parameters a, b, c and d (33) in this order. They are each enclosed by a box. The body of the function definition is placed inside the frame 30. Boxes 34, 35 and 36 represent functions which perform calculations expressed by the symbols "+", "*" and "/", respectively. Arrows entering these boxes from the right side thereof represent arguments given to the respective functions, while arrows exiting from the left side thereof represent values resulting from the processings executed by the respective functions. A composite calculation is thus expressed by a combination of function boxes using arrows.

Figure 5:
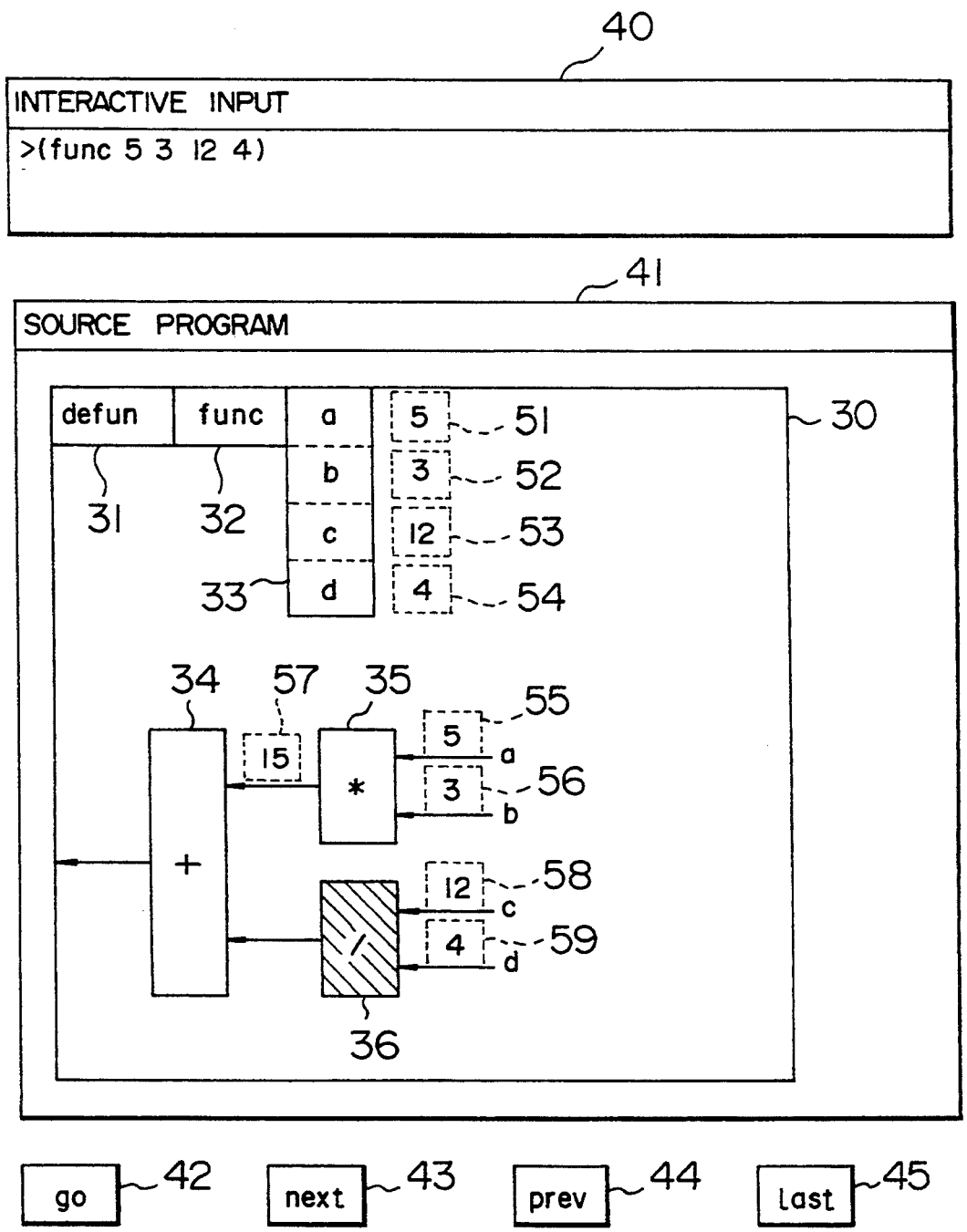
FIG. 5 is a diagram illustrating an example of an execution display on the program in FIG. 4B.

FIG. 5 is an example of a display visually showing the execution of the program of FIG. 4B on the window of the program.

Reference numeral 40 in FIG. 5 designates a window for an interactive input. FIG. 5 illustrates that proper values (5, 3, 12, 4) have been given to the parameters a, b, c and d of the function "func", respectively through the window 40, and the program of FIG. 4B is just started.

Reference numeral 41 in FIG. 5 designates a window showing an execution status of the program of FIG. 4B which is superimposed on the display of FIG. 4B. From the interactive window 40 the parameters a, b, c and d have been given values 5, 3, 12 and 4, respectively (the values given to the respective parameters are shown by phantom boxes 51, 52, 53 and 54 in FIG. 5), and then a multiplication (*) has been executed by the function 35 to derive the resultant value "15" (a phantom box 57). FIG. 5 illustrates the status immediately before a division (/) is executed by the function 36. To visually indicate that the function 36 is to be next executed, the box 36 is hatched.

Reference numeral 43 in FIG. 5 designates a "next" button displayed on the screen. A click on this button by a mouse or the like causes the program execution to advance by one step. In place of a combination of the buttons displayed on the screen and a mouse, such step-by-step execution may be instructed by a function key provided on the keyboard 12. The window 41 in FIG. 5 illustrates that the execution of the program has been advanced one step by one step by using this button (or the function key) to reach a status immediately before the division (/) at the box 36 is executed.

The execution sequence of the program from the start to the status illustrated in the source program display window 41 in FIG. 5 is performed in the following manner:

When an input for starting the function "func" is given to the interactive input window 40, the definition of the function "func" is first displayed in the source program display window. If a mouse is clicked with a mouse cursor placed on the "next" button 43, a status is displayed where the given values 5, 3, 12 and 4 are delivered to the respective parameters a, b, c and d shown in the argument list (represented by phantom boxes 51, 52, 53 and 54). Another click of the mouse on the "next" button 43 results in displaying a status in which the value 5 (phantom box 55) is delivered to the input argument a of the function "*" (box 35). Then, every time the "next" button 43 is clicked by the mouse, a status in which the value 3 (phantom box 56) is delivered to the argument b of the function "*" (box 35); a status in which the function "*" (box 35) receives the value of the argument and executes a multiplication to output the result (phantom box 57); a status in which the value 12 (phantom box 58) is delivered to the argument c of the function "/" (box 36); and a status in which the value 4 (phantom box 59) is delivered to the argument d of the function "/" (box 36) are successively displayed, and finally the status displayed in the window 41 of FIG. 5 is reached. Afterward, if the "next" button 43 is further clicked by the mouse, the calculation results of the functions "/" (box 36) and "+" (box 34) are displayed in order, though not shown in the drawing.

The above-mentioned example has been explained assuming that the execution result of each step is left displayed on the screen. However, if all of these displays are left on the screen, the screen may become too complicated and cause difficulties in visual understanding. It is therefore possible to erase unrelated data from the display each time the execution of each function is completed.

Figure 6:
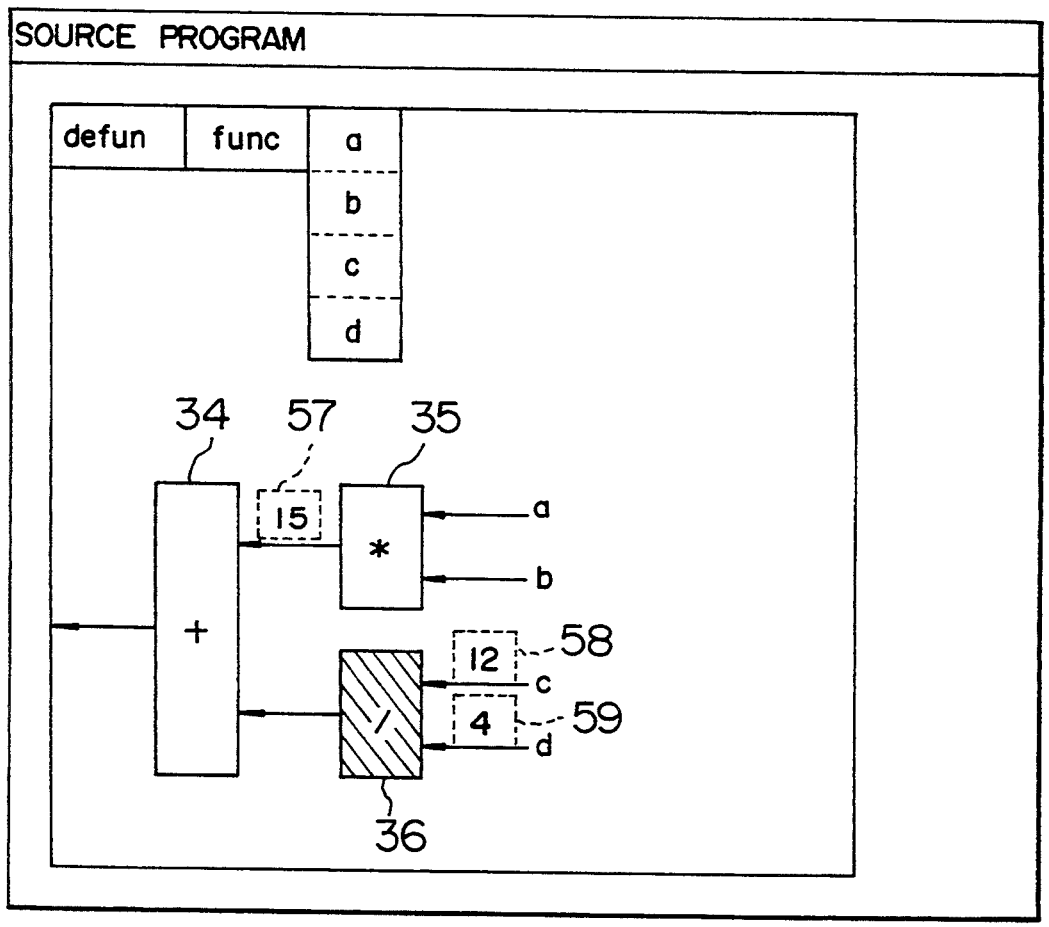
FIG. 6 is a diagram illustrating an example of a display when unrelated figures have been erased after terminating a processing of one execution unit.

For example, if the "next" button 43 is clicked by the mouse in a status where the calculation of the function 35 has been completed and the calculation result 57 is displayed, the value 12 (phantom box 58) is displayed while the values 5 (phantom box 55) and 3 (phantom box 56) of the arguments a and b of the function 35 are erased. Incidentally, the phantom box 57 representing the output result of the function 35 serves as an input to the function "+" (box 34), so that it is left as it is. FIG. 6 illustrates the display of the program execution in this status. The box 57 will be erased when the processing of the function 34 is completed and the execution advances to the next step (although in this example the processing is terminated at this stage and the next step is not provided, there is generally the next step to be processed.)

If the processing result of each execution unit of a program is displayed and erased at an appropriate timing, the display will not become excessively complicated, which results in facilitating the understanding of the execution of the program.

FIG. 7 illustrates an example which displays an executed function with a display attribute indicative of the executed status (indicated by lateral stripes in the drawing) in addition to the display of FIG. 5. In FIG. 7, since the function 35 has been executed, it is laterally striped for such indication.

If a currently executing execution unit and an executed execution unit are distinctively displayed as the function 35 (executed) and the function 36 (executing) as execution of a program is advancing, it is readily understood on the screen to which extent the program is being executed. Additionally, since an unexecuted portion is also distinguished as a result, if a portion which should have been executed is not executed, the recognition in this respect can also be made easily, which is greatly helpful in debugging a program and so on.

Although not specifically depicted in the drawing, if a program includes a function call defined by the user, when the function call is executed and the execution of the function is being suspended on the program displayed on the screen, the function can be distinctively shown with a display attribute indicative of such a status. Such a display allows suspended functions to be distinguished on the screen and accordingly useful in understanding an execution status of a program. Additionally, the display of a suspended status is particularly effective when a previous execution result (execution history) is to be retrieved and displayed (later referred to).

The specific display of executing, executed and suspended statuses can be effectively utilized not only for a source program but also for each module included in a module relation diagram.

Referring now to FIGS. 5 and 6, reference numeral 42 designates a "go" button. A click on the "go" button 42 causes execution of a program to start, similarly to the "next" button 43. However, the "go" button 42 differs from the "next" button 43 in that a program is executed up to a break point, if it has been previously set, or until an error occurs in the program execution, and otherwise the program is executed to the end. Incidentally, when a program is interrupted due to a break point or the occurrence of an error, the program including the interrupted location is displayed on which an execution status up to the interruption is superimposed in the form as shown in FIG. 5.

Reference numeral 44 shown in FIGS. 5 and 6 designates a "prev" button ("prev" is an abbreviation of "previous"). When execution history of a program, that is, a control flow and arguments, variables, return values of functions and so on showing an execution status of the program, and the correspondence between these information and the program are successively stored by request, a click on this "prev" button 44 by a mouse causes the display of an execution status currently on the screen to return to the immediately previous status. By continuously clicking the "prev" button 44, the display can be successively returned to previous statuses. If the "next" button is clicked in this status, the execution of the program can be again advanced in the forward direction.

Reference numeral 45 designates a "last" button. If this button is clicked once when a retracted execution status is being displayed, the display can be returned to the latest execution status (i.e., the status in which the execution history has been lastly acquired).

Figure 36A:
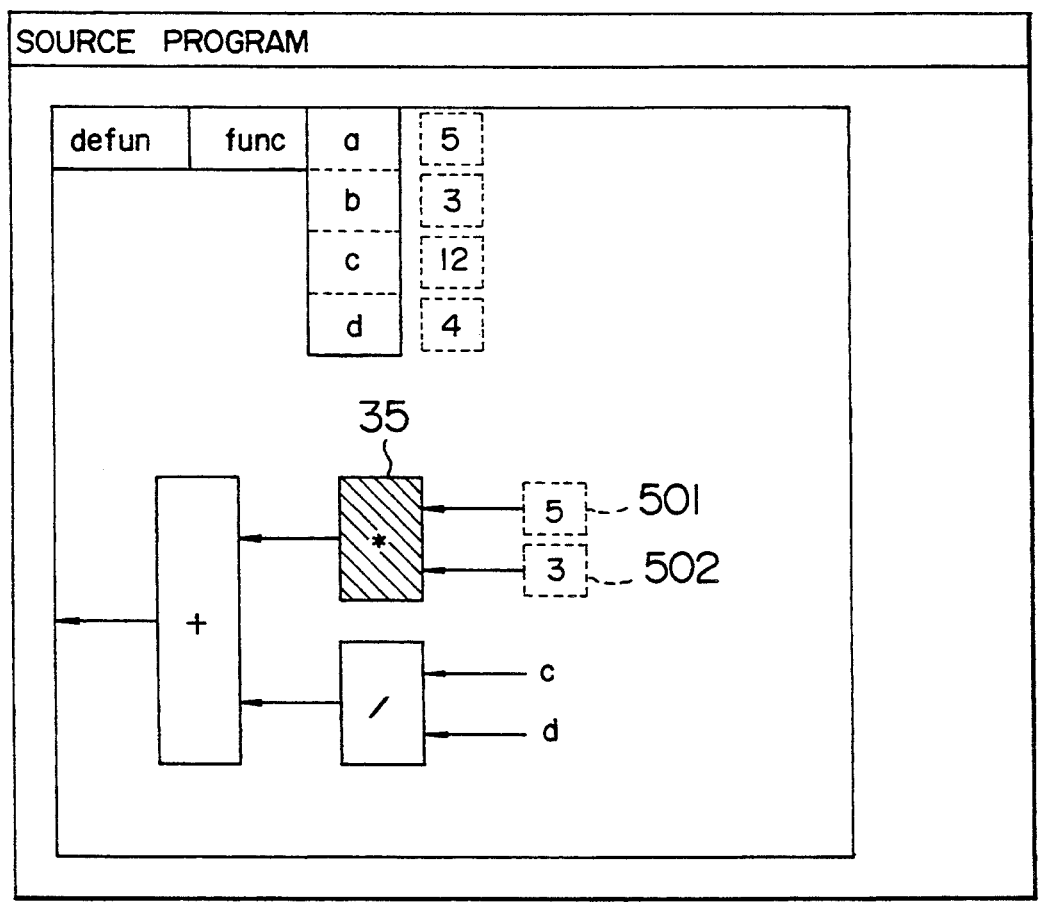
FIGS. 36A and 36B are diagrams illustrating an example of a screen which displays a real argument replaced with its value.
Figure 36B:
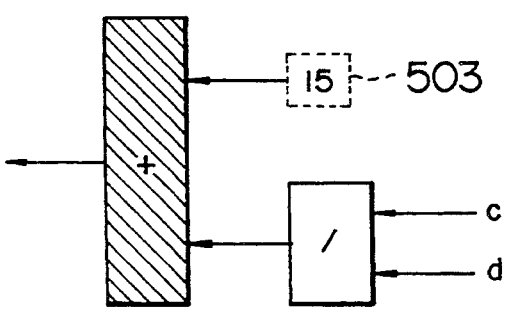

FIGS. 36A and 36B illustrate another example of a program execution display. In the execution display of FIG. 5, the results of processing a program are displayed in the vicinity of related execution units as the execution of the program is advancing. Alternatively in the embodiment shown in FIGS. 36A and 36B, the program execution is displayed while replacing real arguments of respective functions and so on with their values (processing results) as the execution of a program is advancing.

FIG. 36A illustrates a status where the values 5, 3, 12 and 4 have been delivered to parameters a, b, c and d of a function "func", respectively, and real arguments a and b of a function "*" (box 35) have been replaced with the values 5 and 3 (phantom boxes 501 and 502), respectively. Since the function "*" (box 35) is the execution unit to be next executed, the box 35 is displayed with hatching for this indication.

FIG. 36B illustrates that the processing has been advanced by one step from the status shown in FIG. 6A, wherein the function "*" has been processed, and as a result the function "*" has been replaced with the value 15 (phantom box 503).

According to the execution display of the present embodiment, since execution units are successively replaced with their respective values upon termination of the execution thereof, the user can concentrate the execution unit which is to be next executed. It is therefore possible to provide an execution display method which allows the user to easily understand the execution progress of a program.

Next, another example of a program execution display will be described with reference to FIGS. 8A, 8B and 9.

Figures 8A, 8B:
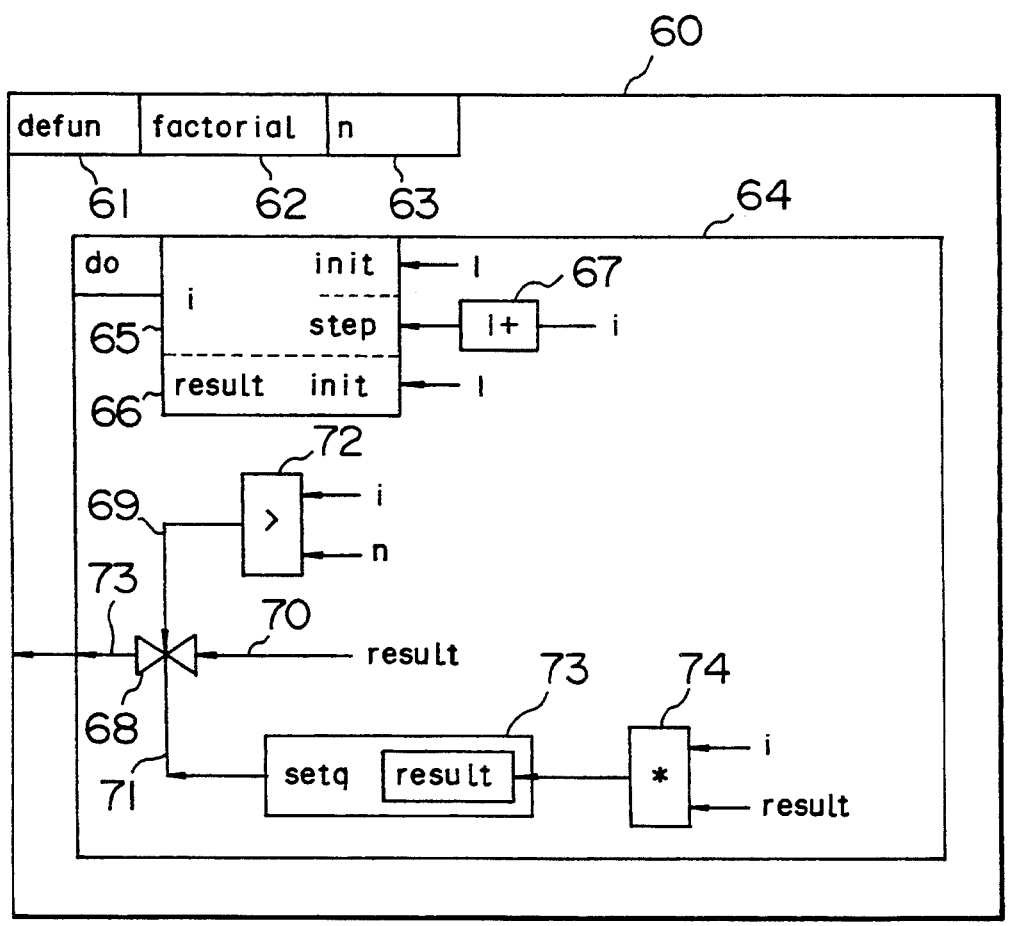
FIGS. 8A and 8B are diagrams illustrating an example of a program including an iteration.

FIG. 8B is a diagram expressing a program showing in FIG. 8A using an iteration form "do" in a visual form. This is an example of a factorial function which multiplies integer numbers from 1 to n with each other.

In FIG. 8B, reference numeral 60 designates a frame for showing the definition of the factorial function. Along the upper side of the frame 60 there are shown from the left a key word defun (61) indicative of the function definition, the name of the defined function "factorial" (62), and a parameter n (63) in this order, similarly to FIG. 3. They are each enclosed by a box. The body of the function definition is placed inside the frame 60.

Reference numeral 64 in FIG. 8B designates a frame for showing the iteration form "do". There are boxes 65 and 66 for showing two variables "i" and "result" used inside the iteration form "do". The variable "i" is provided for controlling the iteration. The variable "i" is given an initial value equal to 1 (indicated by an arrow entering a label "init" of the box 65 representing the variable "i" from the right) and a value indicated by an arrow entering a label "step" from the right from the second iteration. In this event, a value derived by adding one to the previous value of the variable "i" is used as the value of the control variable "i" in the next iteration (which is shown by a function "+1" represented by a box 67 (a function for outputting a value derived by adding 1 to the input)).

The variable "result" represented by a box 66 is provided for storing the calculation result of each iteration. In this case, 1 is given to the variable "result" as an initial value.

A FIG. 68 (formed of two triangles having the respective vertexes opposed to each other) represents an end test portion of the iteration form "do". An arrow 69 entering the FIG. 68 from above represents a condition of the end test. When a value indicated by the arrow 69 is true, the end condition stands, whereby the iterative execution is terminated. At this time the value at a location coupled to the arrow 70 entering the FIG. 68 from the right (the variable "result" in this case) is calculated and outputted via an arrow 73 as the value of the iteration control structure "do".

When the value indicated by the arrow 69 is false, the end condition does not stand, whereby a processing coupled to a line 71 extending downward from the FIG. 68, that is, the iteration processing body is executed.

A box 72 at the beginning point of the arrow 69 represents a function indicative of an end test. In this example, the variable "i" is compared with the variable or argument "n" and "true" is outputted when $i>n$ and "false" is outputted when $i>n$ is not satisfied.

Boxes 73 and 74 represents the iteration processing body. In this example, a function "*" represented by the box 74 multiplies the variable "i" with the variable "result" and a special function "setq" of the LISP language represented by the box 73 substitutes the result of the multiplication for the variable "result".

Figure 9:
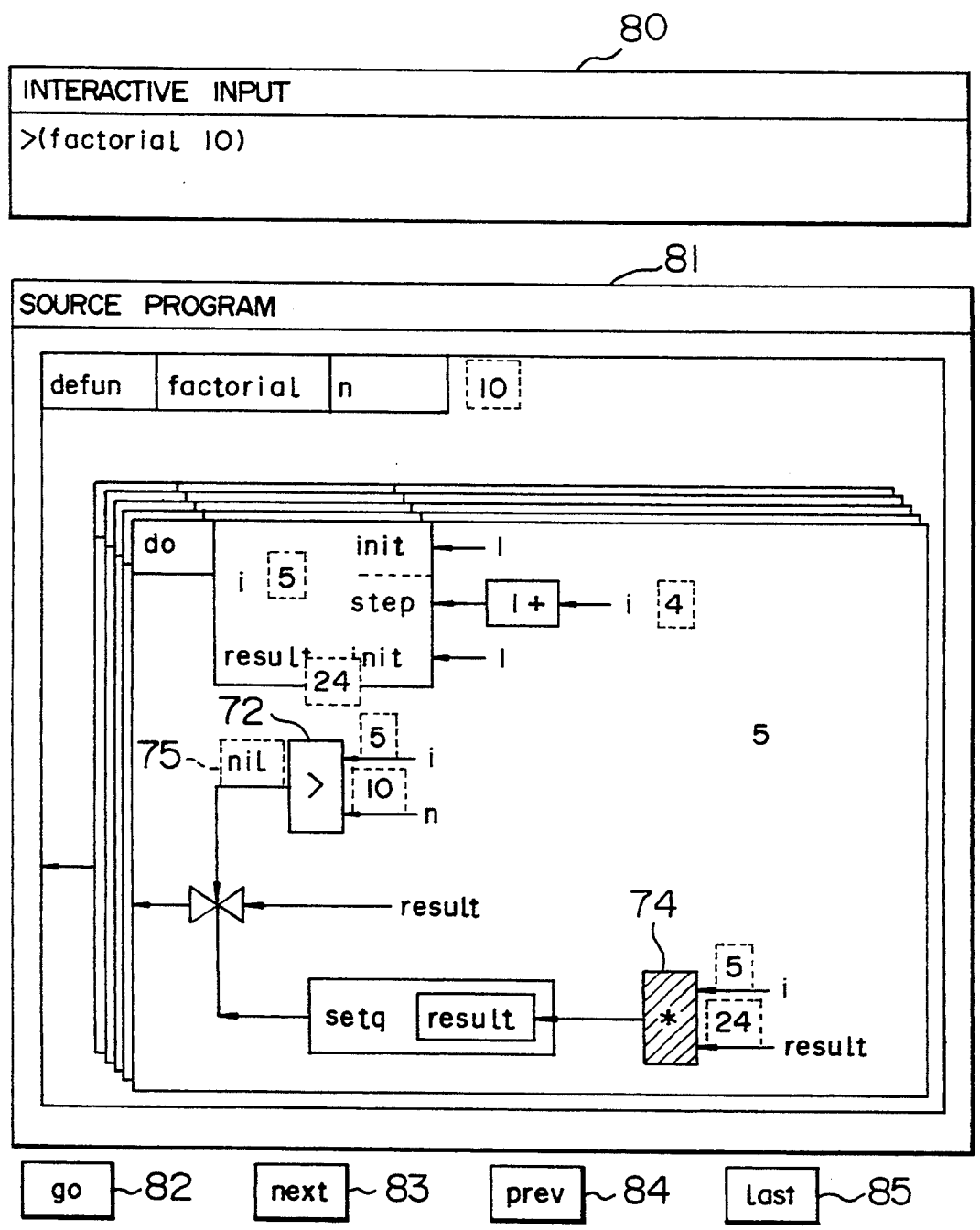
FIG. 9 is a diagram illustrating an example of a display showing the execution of the program (shown in FIGS. 8A and 8B) including an iteration.

FIG. 9 illustrates an example wherein the execution of the program shown in FIG. 8B is superimposed on the display of FIG. 8B.

FIG. 9 illustrates, similarly to the example of FIG. 5, a status where the program shown in FIGS. 8A and 8B has been started with the parameter "n" of the function "factorial" being given the value 10.

Reference numeral 81 in FIG. 9 designates a window which shows an execution status superimposed on the program of FIG. 8B. Specifically, the window 81 shows that the value 10 has been delivered to the parameter "n" from an interactive window 80, and a midway result is derived by executing the iteration form "do" with the variable "i" changed from 1 to 5 (a status immediately before the function 74 is executed with i=5). In this example, displayed are not only data resulting from processings of variables and functions simply superimposed on a program, but also a partial program included in the frame showing the form "do" successively piled up for every iteration unit at the same position (exactly, the displayed position of each frame is shifted little by little). Since FIG. 9 shows a midway result after the program has been executed with the variable "i" changed from 1 to 5, five layers each representing the part of program by the iteration form "do" are piled up. Incidentally, "nil" (phantom box 75) shown as an output value of the function 72 in FIG. 9 represents "false" of the truth-false logic in the LISP language.

An execution status shown in the window 81 has been reached by advancing the program one step by one step by clicking the "next" button 83 by a mouse, similarly to the case of FIG. 5, after the program was started through the interactive input window 80.

A "go" button 82, a "prev" button 84 and a "last" button 85 are respectively provided, similarly to those in FIG. 5, for automatically executing a program until a break point is found, an error occurs or the end of the program is reached without stopping the execution at each step; for returning an execution status display to one step before; and for returning at a scratch from an execution status display retracted by the "prev" button to the latest execution status display.

The pile-up display for indicting iterative execution can be utilized for displaying not only the iteration form "do" of this example but also a variety of iterative executions. For example, this kind of display can be used for a function "mapcar", later referred to. In addition to the iteration, when a recursive call is executed by a function, a subroutine or the like, iterative processings caused by the recursive call may also be displayed in the piled-up manner. The piled-up display is effective particularly in expressing executions of a program module which includes internally defined functions and subroutines.

Figure 10A:
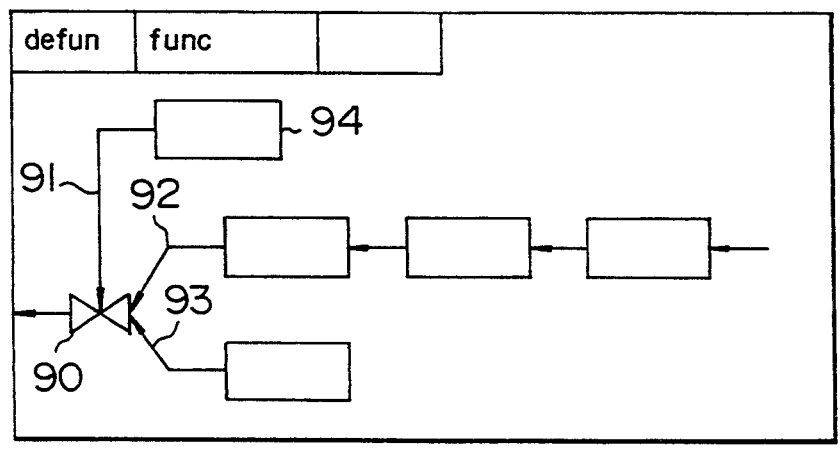
FIGS. 10A and 10B are diagrams illustrating an example of an execution display of a conditional branch.
Figure 10B:
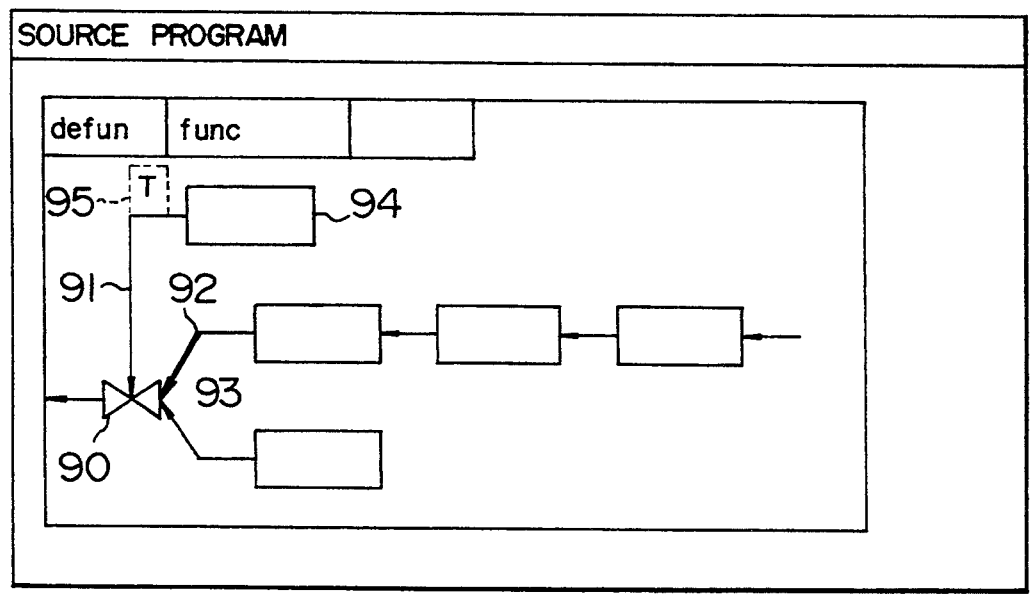

Next, a third example of a program execution display is shown in FIGS. 10A and 10B.

FIG. 10A illustrates an example of a program using a conditional branch. A FIG. 90 formed of two triangles having the respective vertexes opposed to each other represents a conditional branch. An arrow 91 entering the FIG. 90 from above represents a branch condition. When a value indicated by the arrow 91 is true, a partial program coupled to an arrow 92 is executed. On the contrary, when a value indicated by the arrow 91 is false, a partial program coupled to an arrow 93 is executed.

FIG. 10B illustrates a display of an execution status on the program shown in FIG. 10A. Since a status of the arrow 91, that is, an output value of a function 94 is now "T" (phantom box 95: "T" refers to true of the true-false logic in the LISP language), next executed is the partial program coupled to the arrow 92. To emphasize the next execution, the arrow 92 is displayed with a thick line. When the value of the arrow 91 is "nil" (refers to false of the true-false logic in the LISP language), the arrow 93 is displayed with a thick line.

Since this display allows the user to clearly understand a partial program to be next executed, the execution of a displayed program can be more readily followed.

Although in FIGS. 10A and 10B, the arrows coupled to the figures representative of the conditional branch are only displayed with emphasis, if such an emphasized display is performed for a whole program which is executed when a conditional branch including these arrows is true, a further easily understandable display can be realized.

The above-mentioned example shows a two-directional branch by a single condition. A similar display may be applied to a multiple directional branch by multiple conditions to facilitate the understanding of the program execution.

Incidentally, the iteration end test (box 68 in FIG. 8B) included in the foregoing display example showing the iteration form "do" may also be displayed in a similar manner to facilitate the understanding of the execution thereof.

Next, a fourth example of a program execution display will be described with reference to FIGS. 11A and 11B.

Figures 11A, 11B:
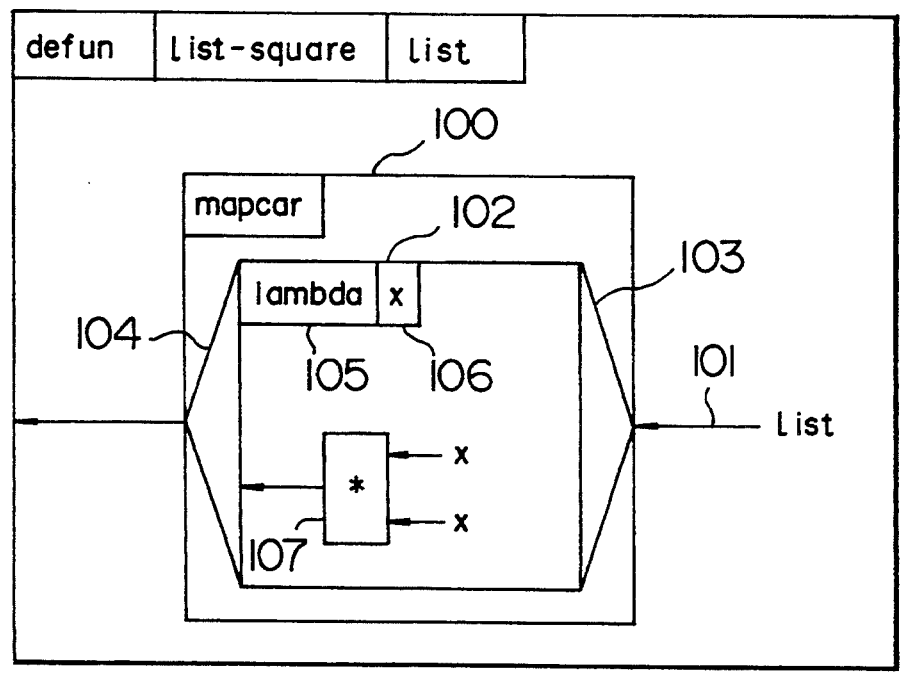
FIGS. 11A and 11B are diagrams illustrating an example of a program including a function "mapcar"

FIG. 11A illustrates a program written in the LISP language which receives a list consisting of numerical values as input and generates and returns a list having elements which are squares of the respective input elements (a list refers to a parenthesized array of elements). FIG. 11B is a visual expression for the program shown in FIG. 11A. This example uses a function "mapcar" special to LISP language.

A function "mapcar" is a function which receives a list and a function as arguments, applies the given function to respective elements of the list, and returns the results after being rearranged in a list. Reference numeral 100 in FIG. 11B designates a visual expression for the function "mapcar". An arrow 101 represents a list of arguments and a frame 102 inside the frame 100 of the function "mapcar" represents a function as an argument. Two triangles 103, 104 on the left and right sides of the frame 102 are visual expressions which indicate decomposition and re-composition of the list. This figure insinuates that decomposed elements of the list are one by one given to the function 102 and the values obtained by the calculations are again composed to form a list.

In the function 102, a box 105 includes a key word "lambda" representing an unnamed function (a function which is not given a specific name), and a box 106 a parameter of the function. A box 107 represents a function "*" for calculating a square of the input argument "x".

Figure 12:
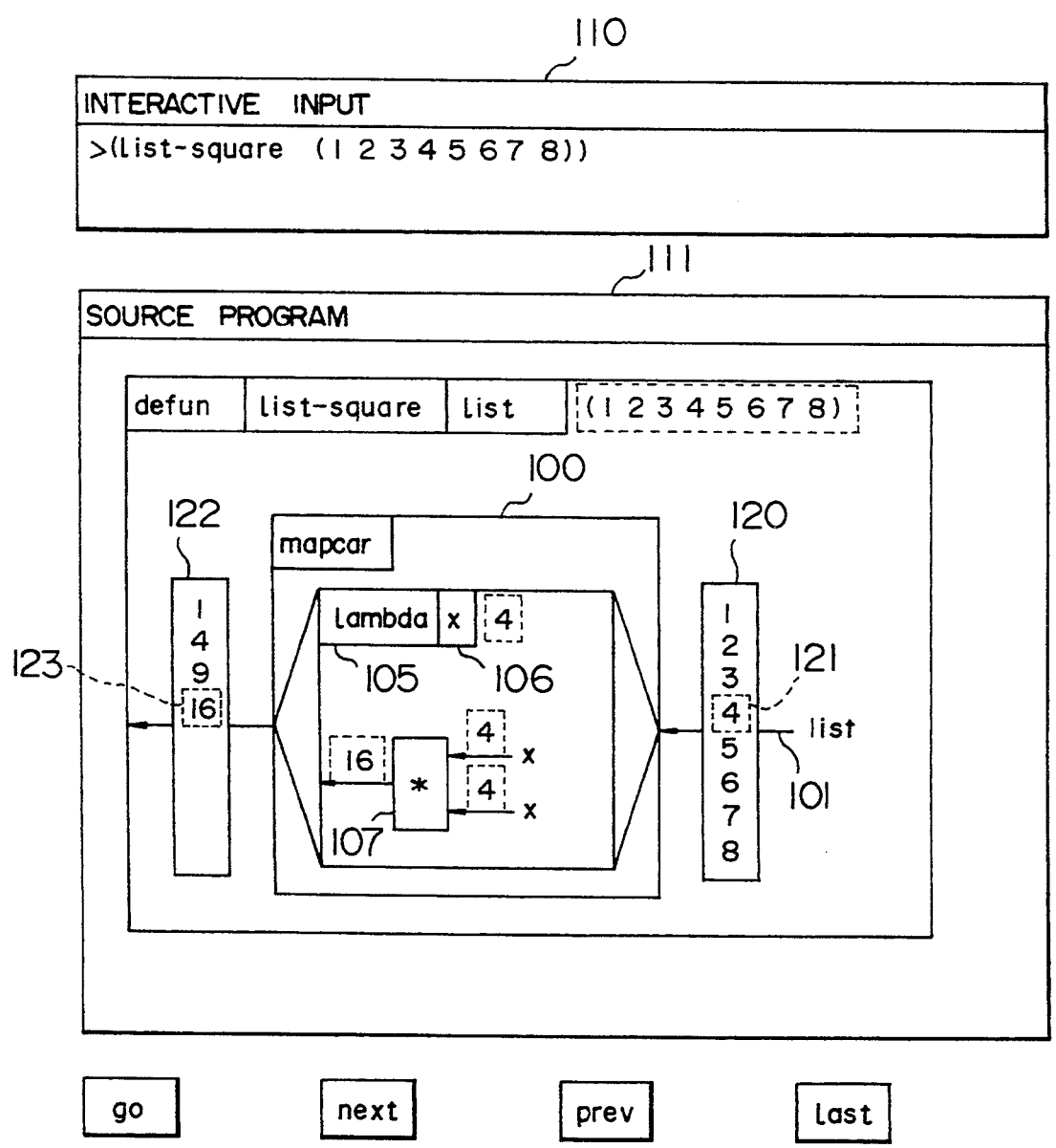
FIG. 12 is a diagram illustrating an example of a display showing the execution of the program (shown in FIGS. 11A and 11B) including the function "mapcar"

FIG. 12 illustrates an example which visually represents execution of the program shown in FIG. 11B superimposed on the display of the program.

Similarly to FIG. 5, FIG. 12 shows that proper values (in this case, a list (1, 2, 3, 4, 5, 6, 7, 8)) have been to the parameter "list" of a function "listsquare" through an interactive input window 110, and the program of FIG. 11B is just started. Incidentally, a quotation mark "'" at the head of the argument list is added to handle the list as data. A processing system of the LISP language usually recognizes what is given as a list as a program and is going to execute it. Therefore, if a list is to be handled as mere data, such a quotation mark must be added in front of the list.

Reference numeral 111 in FIG. 12 designates a window which shows an execution status superimposed on the program of FIG. 11B. Specifically, the window 111 shows a midway result wherein the list (1, 2, 3, 4, 5, 6, 7, 8) were given to the parameter "list" through the interactive window 110, and the fourth element in the list has been calculated by the function "mapcar".

A box 120 represents the values of the list delivered as inputs to the function "mapcar"; a phantom box 121 an element being currently processed; and 122 an intermediate result of the output of the function "mapcar". It can be seen that elements up to that (value 16) corresponding to the input element (value 4) in the phantom box 121 have been so far outputted (phantom box 123).

This display method allows the user to easily understand a processing of a function or subroutine which receives data including a plurality of elements such as an array and a list and processes each of the respective constituent elements.

Next, a fifth example of a program execution display will be described with reference to FIGS. 13A, 13B and 13C.

In general, a program comprises a plurality of modules except for a simple program. Therefore, when program execution is being displayed as shown in FIG. 5, a call of another user defined function may be encountered in the concerned program. In such a case, the display is generally switched to a program of the called function, and the execution display is continued. However, it may be sometimes desirable to simultaneously display a calling program and a called program. Such a display may be readily realized by a recent multi-window system. Nevertheless, since the multi-window system displays two programs in separate windows, where corresponding portions in both programs such as arguments and return values are displayed far from each other, the user must relate corresponding portions of the programs to each other out of his or her own head.

On the other hand, if a program called in a calling program can be displayed within the calling program, it is thought that the understanding of these programs and their executions will be facilitated by virtue of the visual correspondence therebetween.

Figure 13A:
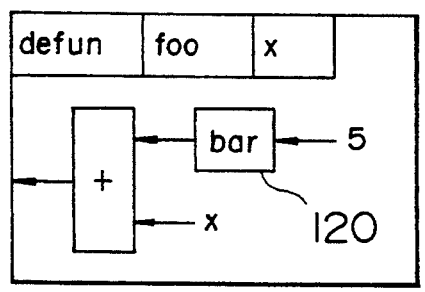
FIGS. 13A, 13B and 13C are diagrams illustrating an example of a dynamically unfolding display.
Figure 13B:
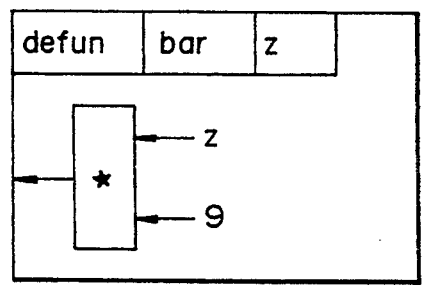
Figure 13C:
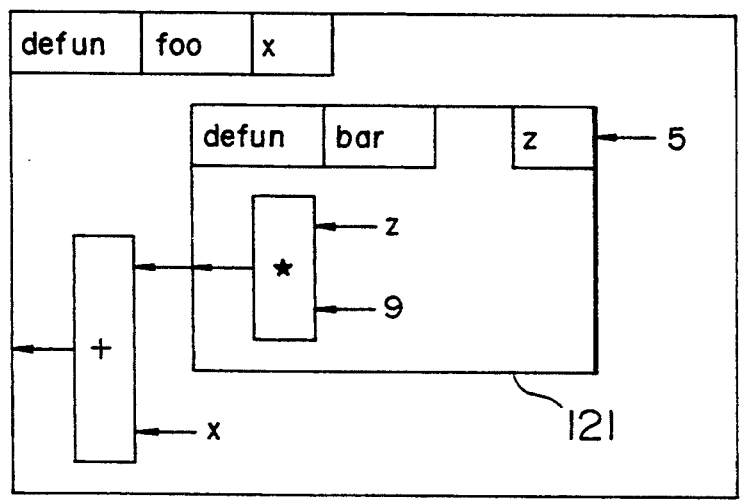

FIGS. 13A, 13B and 13C illustrates the above-mentioned status. Specifically, FIG. 13A graphically represents a program calling another user defined function "bar" (box 120) therein; FIG. 13B the definition of the called function; and FIG. 13C an execution display in which the called function "bar" is replaced with its definition shown in FIG. 13B (see frame 121).

As will be understood from the drawings, since the correspondence between arguments and return values can be directly seen, the execution progress of the program can be more easily followed.

Next, a sixth example of a program execution display will be described with reference to FIGS. 14A, 14B and 14C. This is an example of a program execution display utilizing a module relation diagram. The module relation diagram is a diagram expressing a calling relationship among respective modules or program basic units including functions and subroutines constituting a program which is generally represented in a tree structure.

For a method of displaying program execution using a module relation diagram, methods disclosed in copending U.S. Patent application Ser. No. 507,391 and Japanese Patent Application No. 2-057923 may be utilized.

Generally, even if a module relation diagram includes a module which is called multiple times by a recursive call or the like, multiple displays of such a module are often omitted because of a lack of a display space. However, when a module, although regarded as a single module from a static viewpoint, is called multiple times by a recursive call or the like in a program, it is thought that if this module is displayed for the respective calls on the module relation diagram, the execution of program will be more easily understood.

The earlier application (Japanese Patent Application No. 2-057923) shows, as countermeasures for such a case, a method for a program including repeatedly executed recursive which extends a module relation diagram downward every time a recursive call appears. FIG. 14B illustrates a specific example of this kind of method.

Figure 14A:
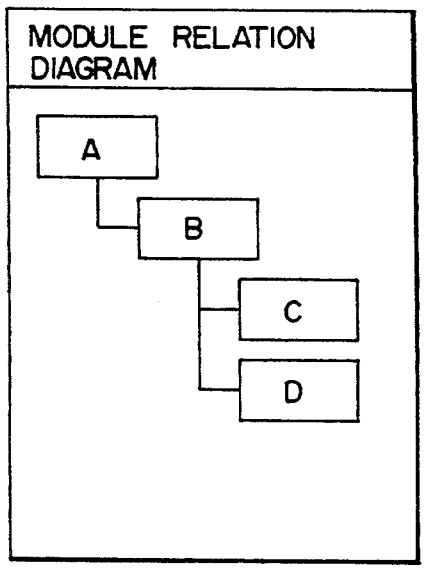
FIGS. 14A, 14B and 14C are diagrams illustrating examples of execution displays using module relation diagrams.

FIG. 14A illustrates an example of the module relation diagram. Suppose now that the control of execution has been delivered from a module A to modules B and D, and then the module D recursively calls the module B. At this time, the module relation diagram is extended downward, as shown in FIG. 14B, to display below the module D a partial module relation diagram having the module B positioned at the top thereof (phantom box 130 in FIG. 14B). If the module B is repeatedly called from the module D, this extension will be also repeated.

This display method can be utilized not only for the recursive call but also for a dynamic call of a program. Actually, since programming languages such as LISP and C permit a program to be handled as an argument of a subroutine or a function, this display method is useful in representing the execution of such a program. Also, since the LISP language permits a program to be stored as a value of a variable and has a mechanism for dynamically starting this program. There are many programs for dynamically starting a program utilizing this mechanism, which can be displayed by the above-mentioned display method in a manner that the execution thereof can be easily understood.

Figure 14B:
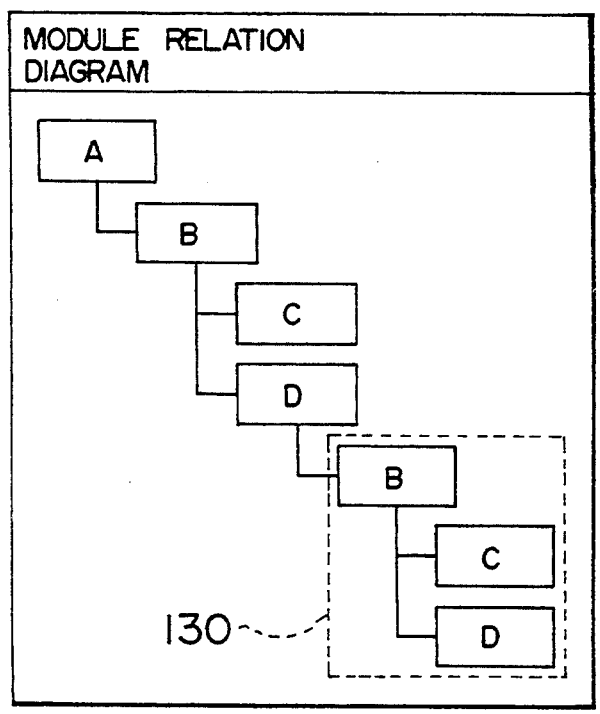

Incidentally, in the method shown in FIG. 14B, when a recursive call is repeated many times, the module relation diagram is extended each time the recursive call is executed, which may cause a problem if a display space is limited.

Figure 14C:
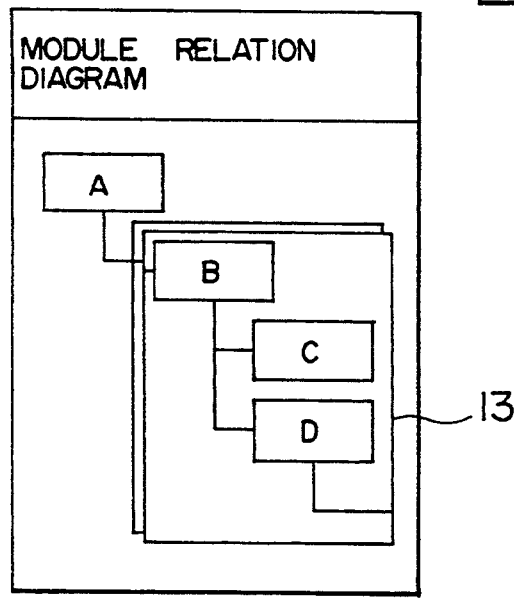

FIG. 14C illustrates a display method for solving this problem. Specifically, in place of extending a module relation diagram, partial module relation diagrams having a module B positioned at the top thereof are displayed in a piled-up manner substantially at the same position (exactly, the displayed position of each diagram is shifted little by little). When a recursive call is executed multiple times, diagrams are piled up the same multiple times.

Since this method prevents the module relation diagram from extending, the problem of a display space is avoided. Also advantageously, a repetition of recursive calls are displayed at one position by the piled-up display, which is effective in recognizing the frequency of recursive calls.

This piled-up display method can be utilized not only for a recursive call but also for a case where a module includes a iterative execution statement in which lower-level modules are recursively called. In this case, if a piled-up display representing the recursive call is distinctively displayed with different attributes from a piled-up display representing modules called by the repetitive execution statement, the program execution will be more easily understood. To this end, a variety of method can be taken, for this example in FIG. 14C, the width of the line of the frame 131 may be changed, a region enclosed by the frame 131 is filled with a different color, and so on.

Figure 15A:
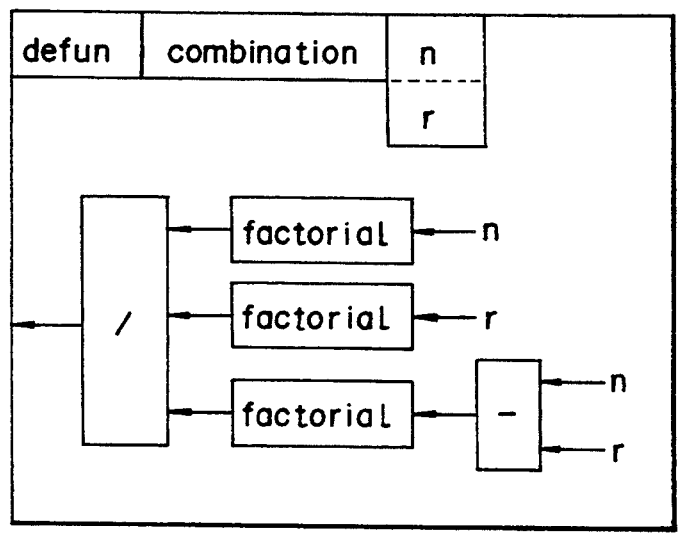
FIGS. 15A and 15B are diagrams respectively illustrating an example of a retrieval of an execution history by utilizing a module relation diagram and a source program.

The understanding of program execution can be further facilitated, by extending a module relation diagram each time a call is executed not only for the case of a recursive call or a dynamic call as described above but also for the case where the same lower module is called a plurality of times. For example, FIG. 15A illustrates that a function "combination" calls the same function "factorial" three times. A branch representing the function "factorial" may be dynamically extended on the display of a module relation diagram every time this function is called, as shown in FIG. 15B.

Figure 15B:
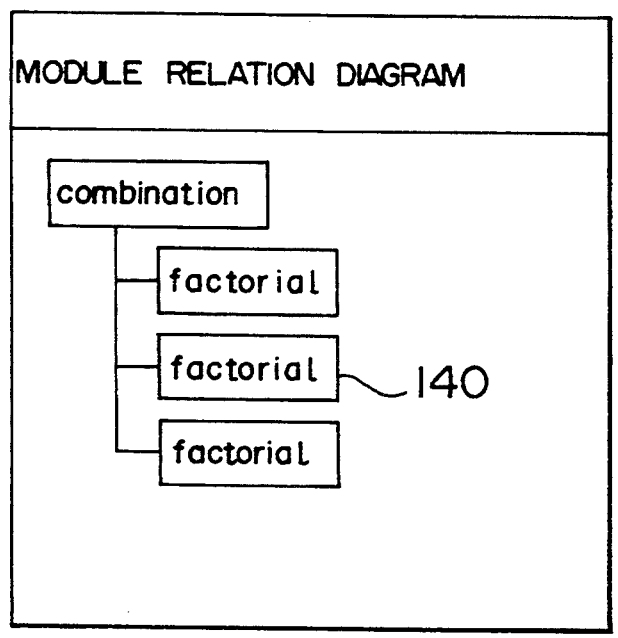

Though not shown, if an execution history of the program is preserved for the cases of FIGS. 14B, 14C and 15B, an execution status currently displayed on the screen can be changed to a previous status by clicking the "prev" button.

Further, if an extended or piled-up partial module relation diagram is erased after the execution of that part has been completed, a clear display may be provided.

A combination of a module relation diagram with an execution display by the foregoing visual expression program will enable the user to effectively understand execution of a program.

It goes without saying also for this case that an execution history retroacting function by the "prev" button and an erasure of execution completed portions can be applied to each of the module relation diagram and the visually expressed program.

Next, a seventh example of a program execution display will be described with reference to FIGS. 15A, 15B, 16 and 17.

Generally, when execution of a program is being monitored for the purpose of debugging or the like, it is sometimes desired to examine again a previous execution status. Co-pending U.S. Patent application Ser. No. 507,391 and Japanese Patent Application 2-057923 show a solution for such a demand. Specifically, the techniques of these documents retrieve data related to a previous execution status (arguments of modules, return value, update values of function and so on) and display them on a module relation diagram when a program comprises a plurality of modules. However, if such data related to a previous execution status are not only simply displayed but also superimposed on a source program as shown in the foregoing embodiments of the present invention, it can be easily imagined that the understanding of these data is facilitated by the superimposed display. By superimposing data as mentioned above on a source program, arguments, return values and update values of variables as well as a midway processing status of a program are clearly displayed, thereby producing a remarkable effect.

Figure 37:
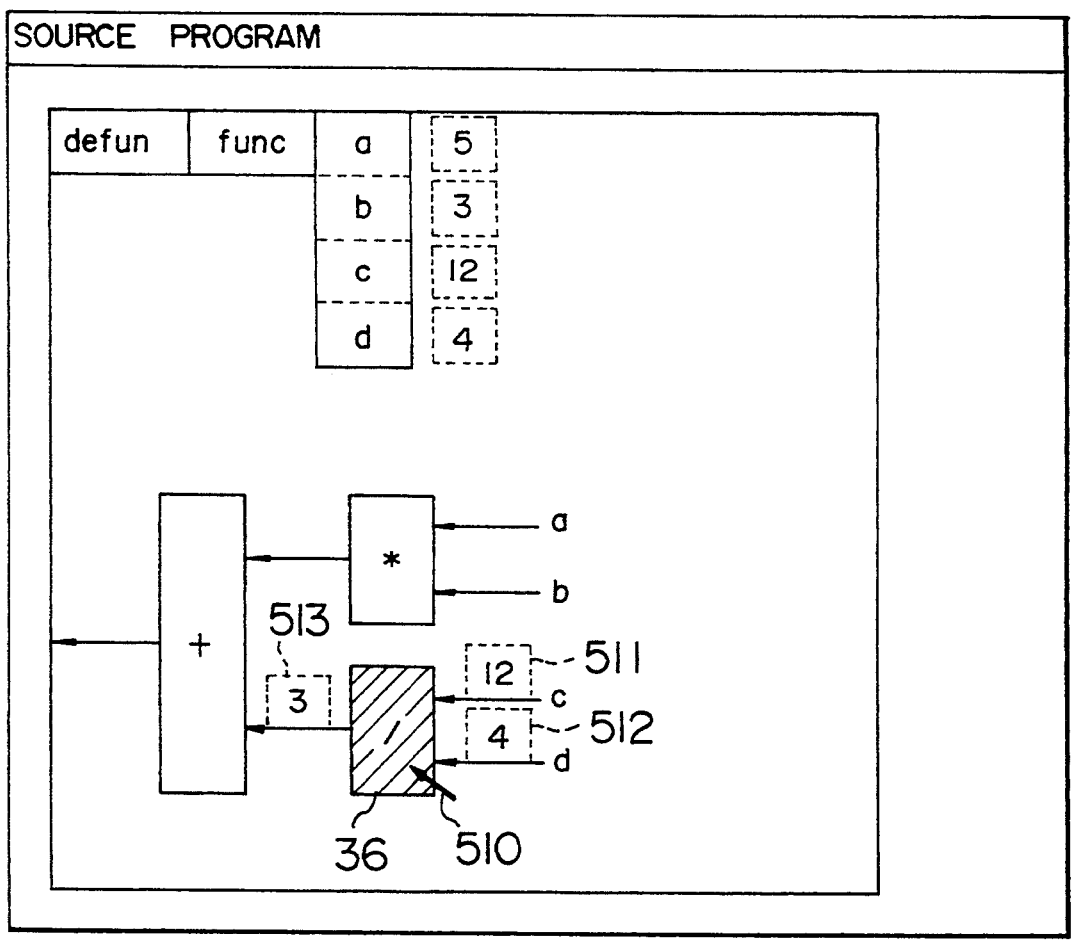
FIG. 37 is a diagram illustrating an example of values related to a retrieval of an execution history and a selected execution unit displayed in the vicinity of the execution unit.

FIG. 37 illustrates an example of the above-mentioned execution history retrieval. The drawing shows that after a program has been executed to its end, a mouse button is clicked with a mouse cursor 510 placed on a function "/" (hatched box 36) to select the function 36, and a display of arguments and a return value related to the function 36 has been instructed. For visually representing a selected function, the box 36 is emphasized, and related arguments 511, 512 and a return value 513 are displayed at corresponding positions.

Next, description will be made as to an example of a bit high-grade execution history retrieval.

FIGS. 15A and 15B illustrates an example of a function for calculating the number of combinations when r elements are selected from different n elements. The number of combinations is calculated by $n!/(r!*(n-1)!)$. Calculations of n! and so on can be made by the foregoing function "factorial" so that the number of combinations can be derived by combining respective calculations. A function "combination" in FIG. 15A is a function for executing this process.

Suppose now that the function "combination" was given arguments 7 and 5, started and executed to its end. FIG. 15B is a module relation diagram showing the whole execution history. As can be understood from FIG. 15A, the function "combination" has called the function "factorial" three times. Therefore, in a manner similar to the sixth display example, three boxes representing the function "factorial" are displayed below a box representing the function "combination" corresponding to each execution.

Figure 16:
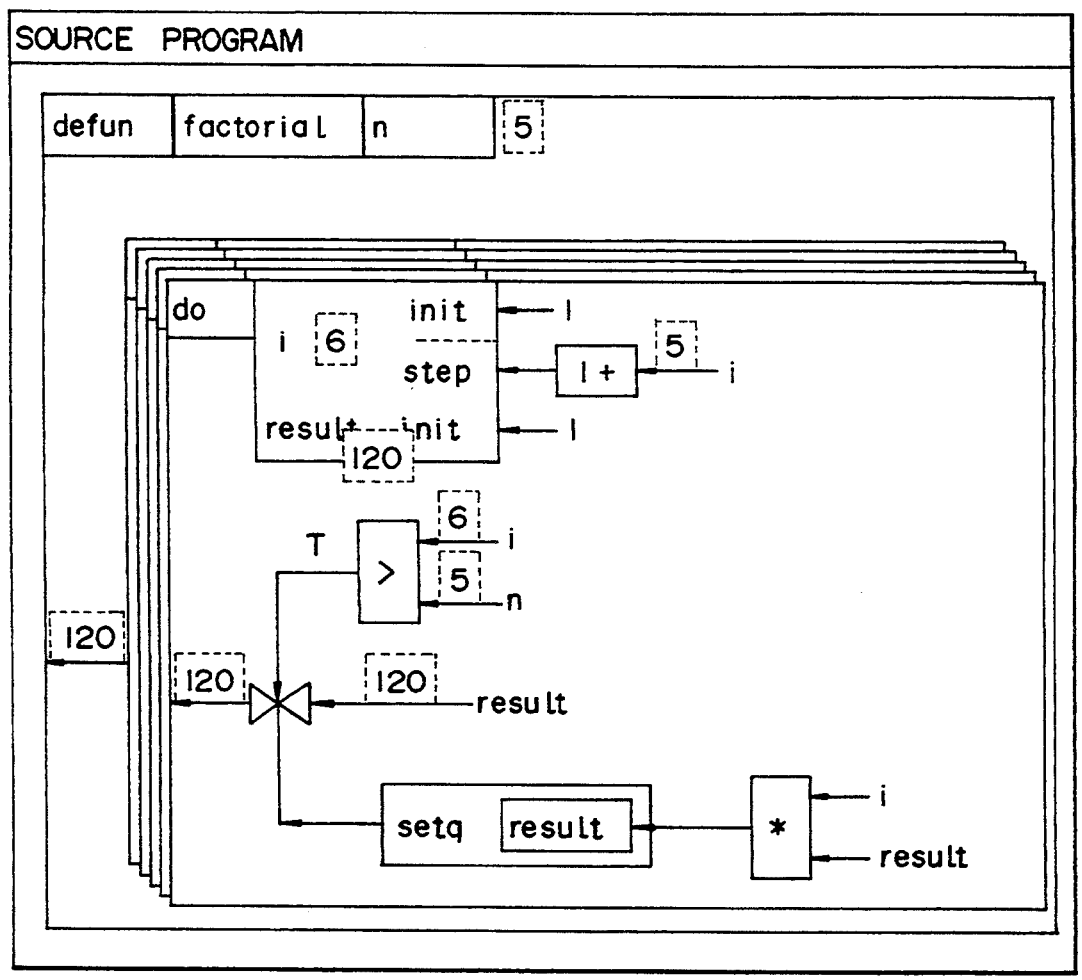
FIG. 16 is a diagram illustrating another example of a retrieval of an execution history by utilizing a module relation diagram and a source program.

Suppose next that a previous execution status is to be displayed. Specifically, a midway status when the function "factorial" was called at the second time (box 140 in FIG. 15B) is to be displayed on the module relation diagram of FIG. 15B. In this event, when a mouse is clicked with a mouse cursor placed on the box 140, a program of the function "factorial" is displayed with data related to an execution status thereof superimposed thereon (FIG. 16). Since the function "factorial" includes an iteration form "do", a display representing an execution status of each iteration is superimposed on a partial program formed by the iteration form "do", and all these execution statuses for respective cycles are piled up on a position where the form "do" is displayed.

Figure 17:
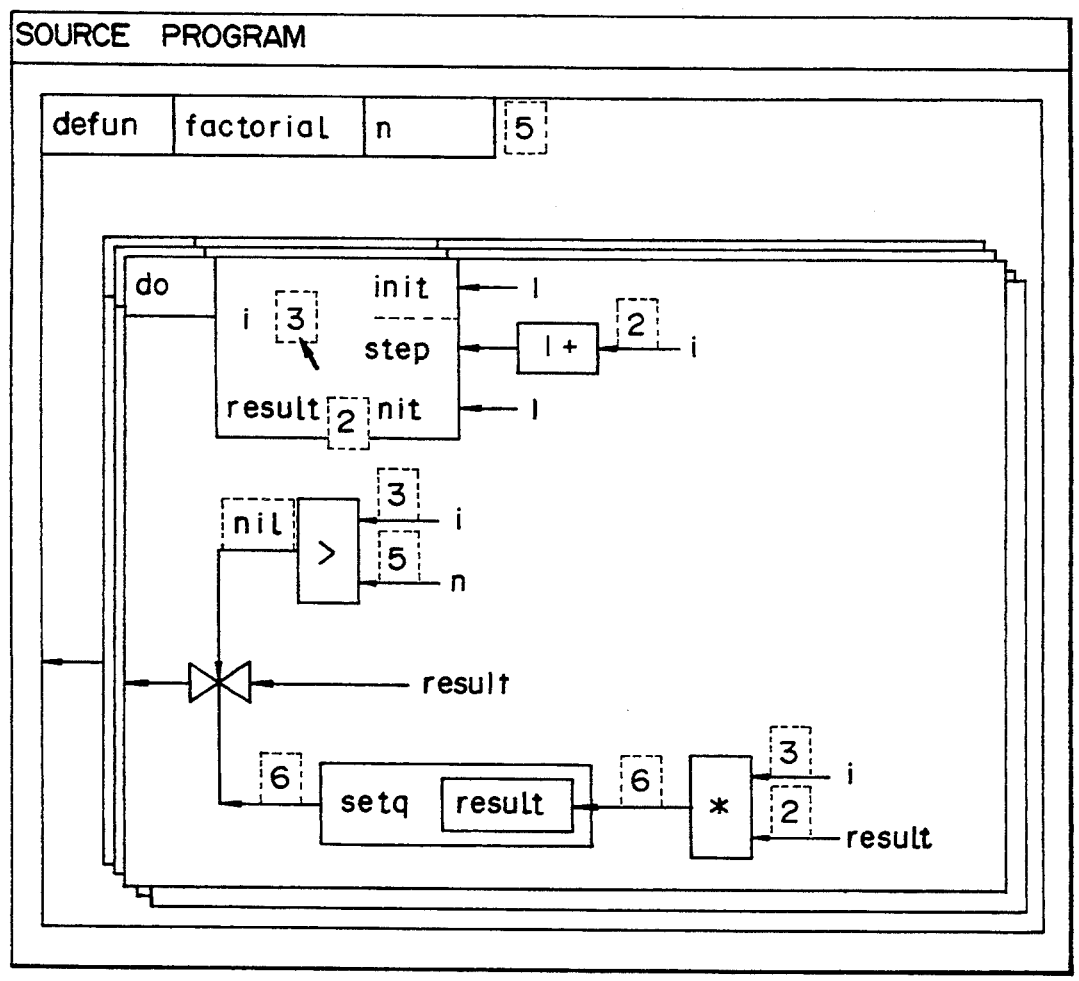
FIG. 17 is a diagram illustrating a further example of a retrieval of an execution history by utilizing a module relation diagram and a source program.

Suppose now that the user desires to see an execution status of the third iteration of the form "do" in greater detail. To this end, if a mouse is clicked with a mouse cursor pointing the third frame from the bottom, an execution status at that time, that is, in the third iteration is brought to the top of the stack and displayed (FIG. 17).

Figure 18:
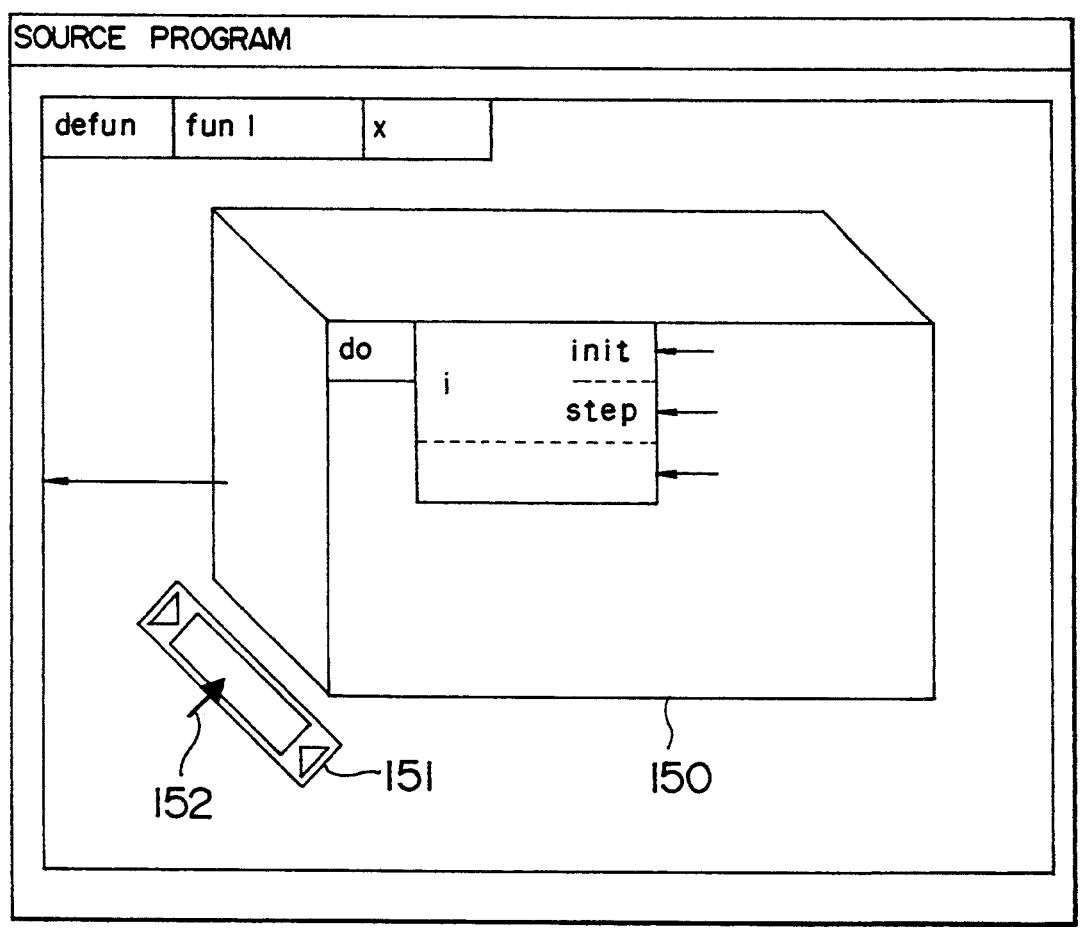
FIG. 18 is a diagram illustrating an example of a piled-up display and an execution history retrieval when a large number of iterations are performed.

Incidentally in this example, since the number of iterations is several, figures corresponding to respective iterations can be displayed with a shift in a manner that they are sufficiently visually distinguishable from each other. It is therefore quite easy to select one from such figures. However, as the number of figures is larger, it becomes difficult to select one from them. In such a case, the piled-up figures may be represented as a virtual solid figure (150) as shown in FIG. 18. In this figure, the height represents the number of iterations.

Utilizing this solid figure, an execution history retrieval may be executed in the following manner. When the solid figure is selected by the mouse cursor, a scale bar 151 is displayed for indicating a relative position of the number of iterations. Then, by specifying a position proportional to a desired number of iteration by a cursor 152, an execution history corresponding to the desired number of iteration can be displayed.

Incidentally, the display method using a solid figure is applicable to the piled-up display on the module relation diagram of FIG. 14C.

Although FIGS. 16 and 17 each have shown an example of displaying all related execution history superimposed on a retrieved program, all these figures may be confusing from a visual point of view and require much labor for retrieving a desired portion on the displayed program. It is therefore possible to solely display a source program as a retrieval result and superimpose thereon necessary data (execution history) at the request of the user (indicating a related location by the mouse).

Since a lot of memories are required to store all execution histories, modules whose execution history is to be preserved or a program portion whose execution history is to be preserved in a module may be previously specified on a module relation diagram.

Figures 19A, 19B:
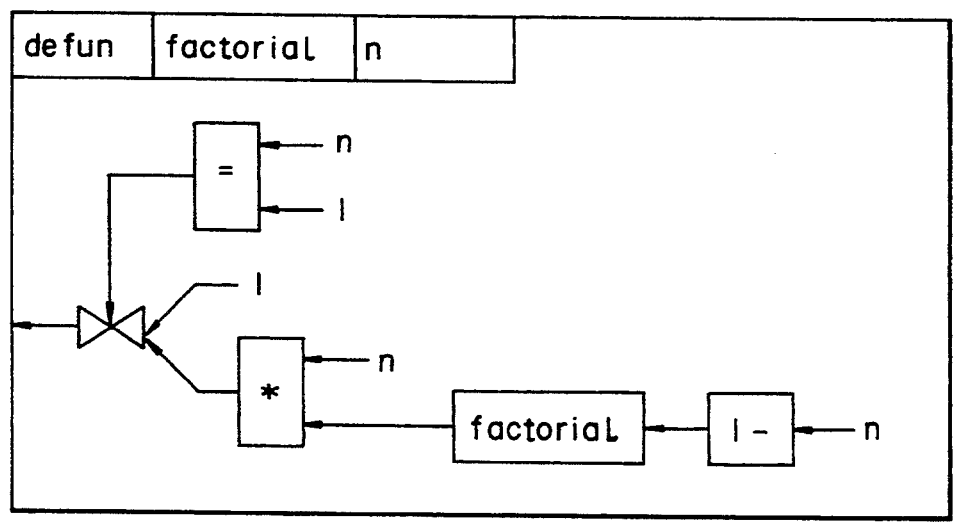
FIGS. 19A and 19B are diagrams illustrating a recursive definition of a function "factorial"

Although in this example, the function "factorial" is realized by an iteration form, it can be described in a recursive form. The program in such a recursive form is shown in FIGS. 19A and 19B. FIG. 19A is a program of the function "factorial" written in the LISP language, and FIG. 19B a visual expression for the same.

Figure 20:
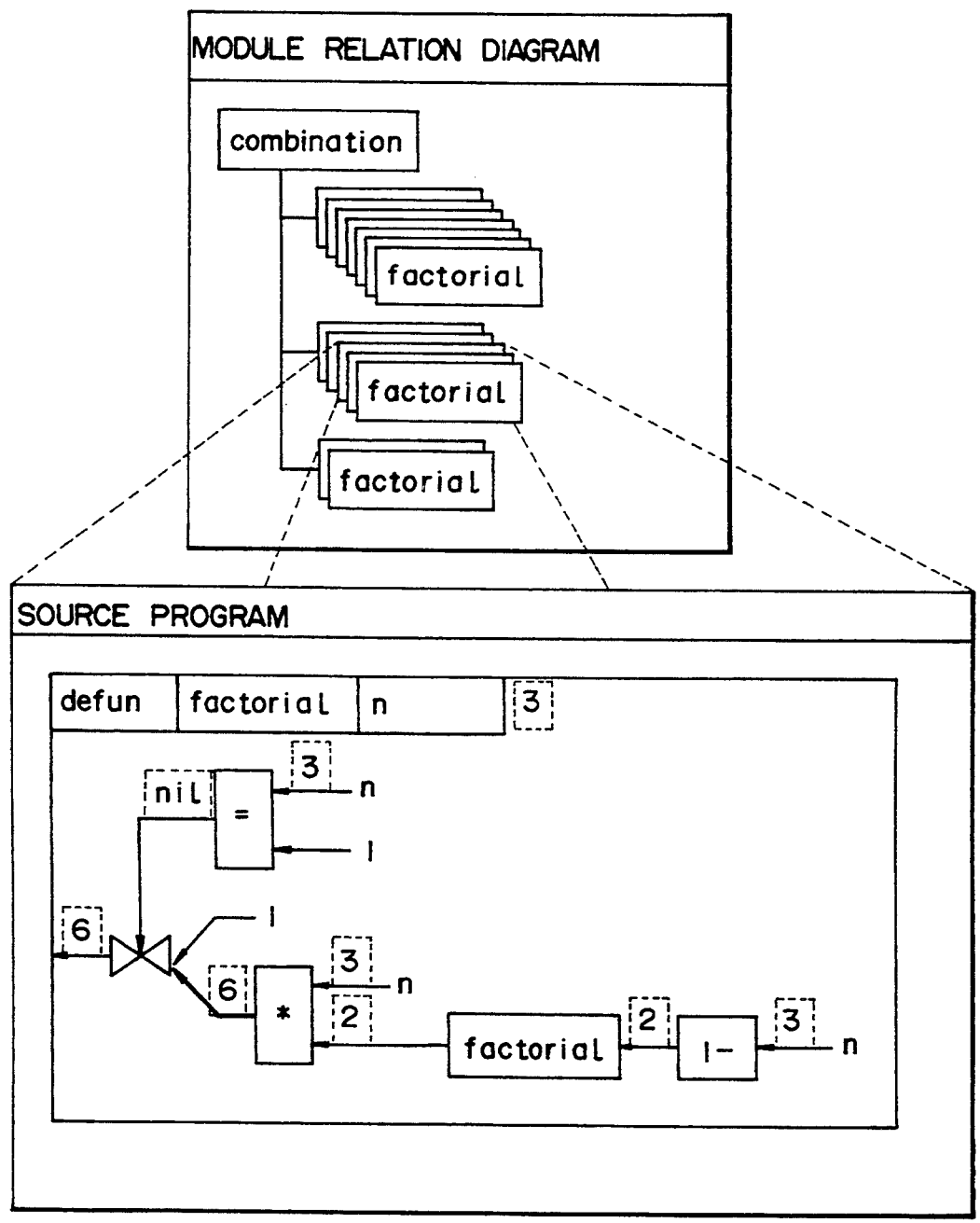
FIG. 20 is a diagram illustrating an example of an execution history retrieval executed on a program including a recessive function.

When the foregoing function "combination" is similarly executed by using a recursive definition of the function "factorial", a consequently derived module relation diagram is as shown in the upper part of FIG. 20. Specifically, the function "factorial" is displayed as having the same number of layers as the number of recursions thereof on the module relation diagram of FIG. 5B.

A selection of one of the piled-up modules causes an execution history of the selected module to be displayed superimposed on a source program of the module (the lower part of FIG. 20). When a figure including a plurality of modules is displayed in the piled-up manner as shown in FIG. 14C, a layer is selected to be brought to the top of the figure, and then a desired module may be selected.

When one of displayed modules is selected in the module relation diagram shown in FIG. 15B or 20, it is possible to only display arguments and return values when the module was called without displaying its source program. Actually, such a display is often sufficient for a debugging operation.

Figure 38:
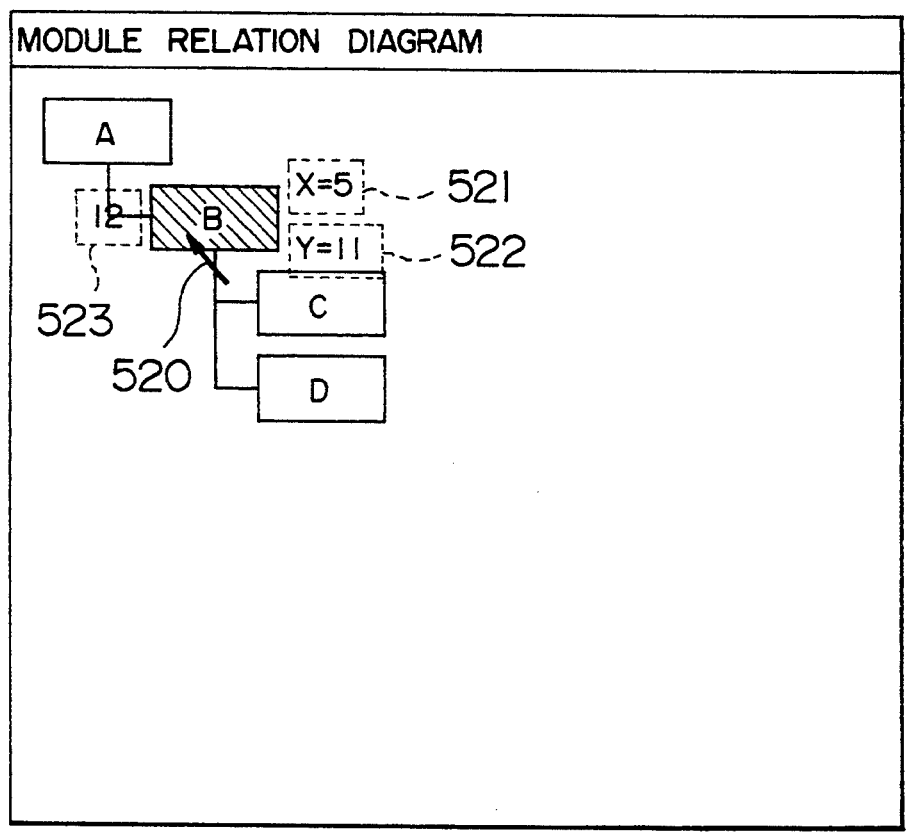
FIG. 38 is a diagram illustrating an example of a display which shows a retrieval of related arguments and return values by using a module relation diagram.

FIG. 38 illustrates an example of displaying arguments and return values of a selected module superimposed on a module relation diagram. Specifically, the drawing shows that a mouse button was clicked with a mouse cursor 520 placed on a module B to select the same, and a retrieval and display of arguments and a return value related to the module B was instructed. To indicate a selected status, the module B is displayed with emphasis. Arguments 521, 522 and a return value 523 are respectively displayed at proper positions in the vicinity of the module B.

The foregoing program execution display method is also useful for displaying errors which may occur during execution of a program.

Generally, if an error occurs while a program is being debugged, the error occurring location (a location in a concerned module in all modules) is detected, and values of related data are checked. A method for supporting this processing, that is, a method of displaying an error occurring module in a module relation diagram, an error occurring location in the module, and related data (arguments of the module and values of variables) has been shown in co-pending U.S. Patent Application Ser. No. 507,391. However, it can be easily imagined also for this case that if related data can be displayed superimposed on a source program of a concerned module, an error status or the like will be easier to understand, similarly to the so far described examples. Also, if break points are set in a program such that a source programs of a module including the break point is displayed together with execution history data when a specified break point is reached, it will be easily understood that a debug can be easily carried out.

Thus, description has been made as to a variety of examples of the program execution display method according to the present invention. A method of realizing those displays will hereinafter be described specifically.

Figure 21:
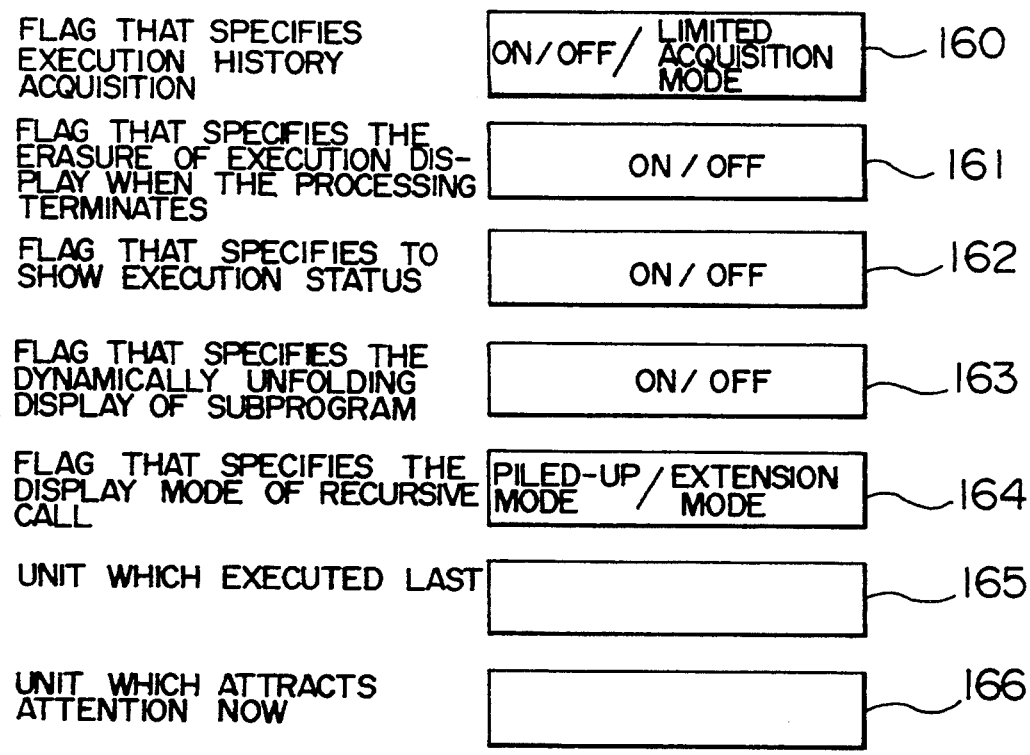
FIG. 21 is a diagram showing a system variable list.

FIG. 21 is a list of flags (software variables) for controlling a variety of display and execution modes of a system and variables for holding status data of a program under execution.

"Flag that specifies an execution history acquisition" 160 is a flag for controlling whether or not an execution history of each step is acquired (preserved) during execution of a program. When this flag is ON, all execution histories are preserved. When it is OFF, nothing is preserved. When the flag is set to a limited acquisition mode, execution histories of objects specified by a command to specify objects of which execution history will be acquired, later referred to, are only acquired (preserved).

"Flag that specifies the erasure of execution display when the processing terminates" 161 is a flag for controlling whether or not a display of unrelated data is maintained each time execution of a function has been terminated at each step. When this flag is ON, a display of data related to an execution terminated portion is erased (see a display example of FIG. 6). When it is OFF, all data related to an execution display on the screen is maintained as it is even if the execution has been terminated.

"Flag that specifies to show execution status" 162 controls whether or not executing, executed and suspended execution units displayed on the screen are distinctively shown. When this flag is ON, executing, executed and suspended statuses are distinctively displayed (see a display example of FIG. 7). When it is OFF, executing execution units are only displayed.

"Flag that specifies the dynamically unfolding display of subprogram" 163 is a flag for determining, when another program is called during an execution display of a program is on the screen, whether or not the program is shown dynamically unfolded at a calling location of a calling source program (see a display example of FIG. 13C). When it is OFF, such a dynamically unfolded display is not performed, and instead the called program is displayed in another window while the execution display is continued.

"Flag that specifies the display mode of recursive call" 164 is a flag for determining, when a direct or indirect recursive call is instructed to a program whose execution display is on the screen, whether the execution display is piled up on a related partial module relation diagram or extended downward on a module relation diagram. When this flag indicates a piled-up display mode, the execution display is made in a piled-up form, whereas when it indicates an extending display mode, the execution display is extended downward (see a display example of FIG. 14C).

"Unit which executed last" 165 stores the execution unit which an execution control program 8 executed lastly of ever executed execution units by an instruction of the user using the "next" button or the "go" button. Specifically, a pointer of a memory address at which the execution unit exists is stored. When the "next" button or "go" button is clicked while the execution is interrupted, this "Unit which was executed last" 165 is referenced, and the execution is resumed from the next execution unit.

"Unit which attracts attention now" 166 stores a pointer of an address at which an execution unit currently attracting attention (that is being displayed on the screen) for a retrieval of an execution history or the like is present when this execution unit is different from that indicated by the "Unit which executed last" column.

Figure 23:
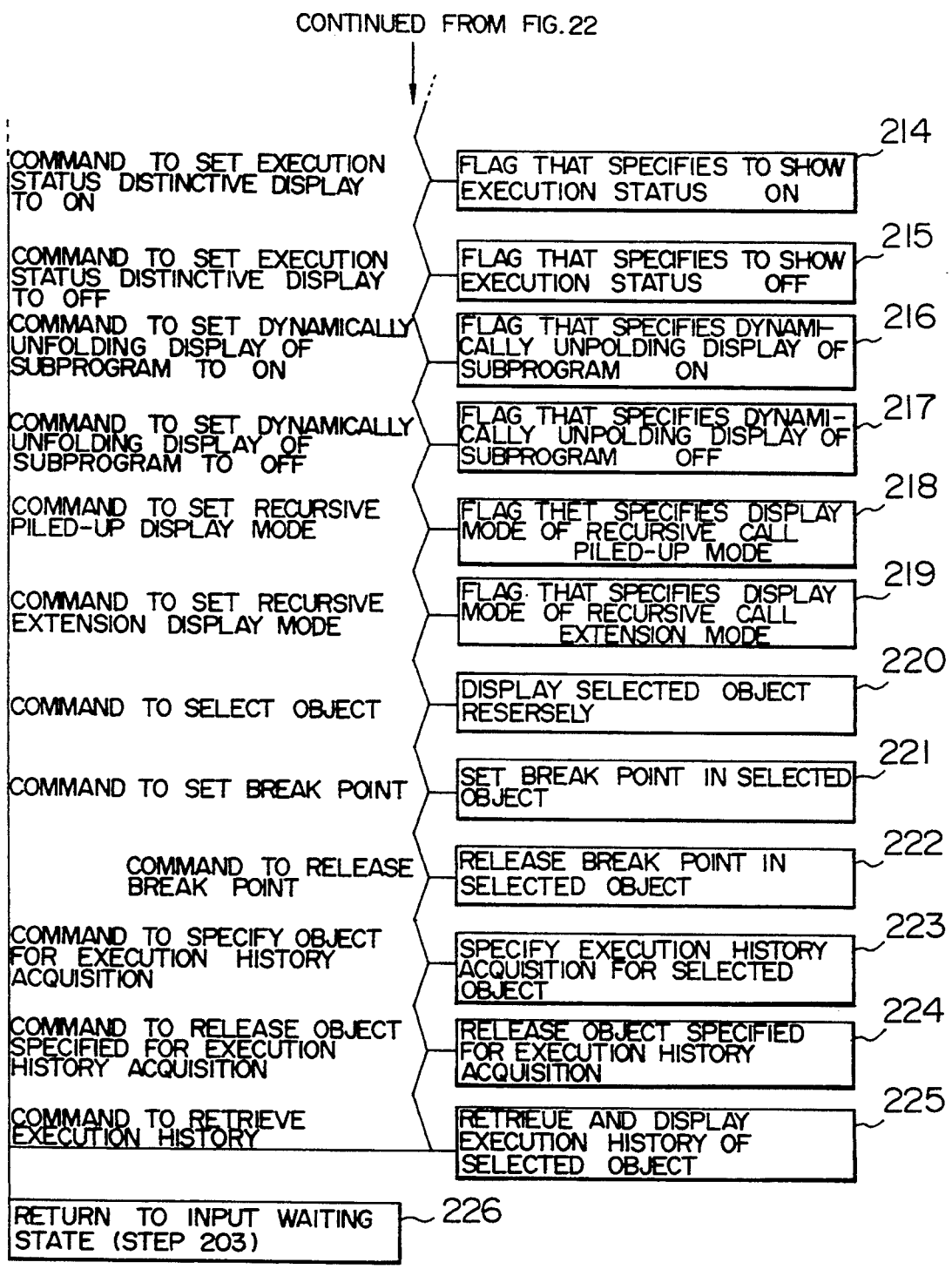
FIG. 23 is a flow diagram illustrating another part of a processing diagram of the input interpretation and main control program following the flow diagram of FIG. 22.

FIGS. 22 and 23 are PAD illustrating a processing flow of the input interpreting main control program 11 shown in FIG. 2.

When the user inputs a command for starting a function from the interactive input window 20 at step 200, a module relation diagram generating program 6 is instructed to create a module relation diagram having a specified function positioned at the top thereof and display the same in the window 21 shown in FIG. 1 at step 201. Simultaneously, a transformation program 2 for transforming a program from a textual expression to a visual expression is instructed at step 202 to display a visual expression for a source program describing the definition of the specified function on the source program window 22 of FIG. 1. Afterward, at step 203 the user is prompted to enter an input.

The processing of the module relation diagram generating program 6, that is, a method of creating a module relation diagram is performed in the following manner. First, respective modules constituting a program is analyzed, user defined function calls (or subroutine calls, macro calls or the like) are extracted, and data indicative of respective calling relationships is created in a tree structure. Next, an actual module relation diagram is displayed on the screen based on this data. In this event, the former half of the processing is executed by the module relation diagram generating program 6 of FIG. 2, while the latter half is executed by the display control program 4 of FIG. 2.

Figure 24:
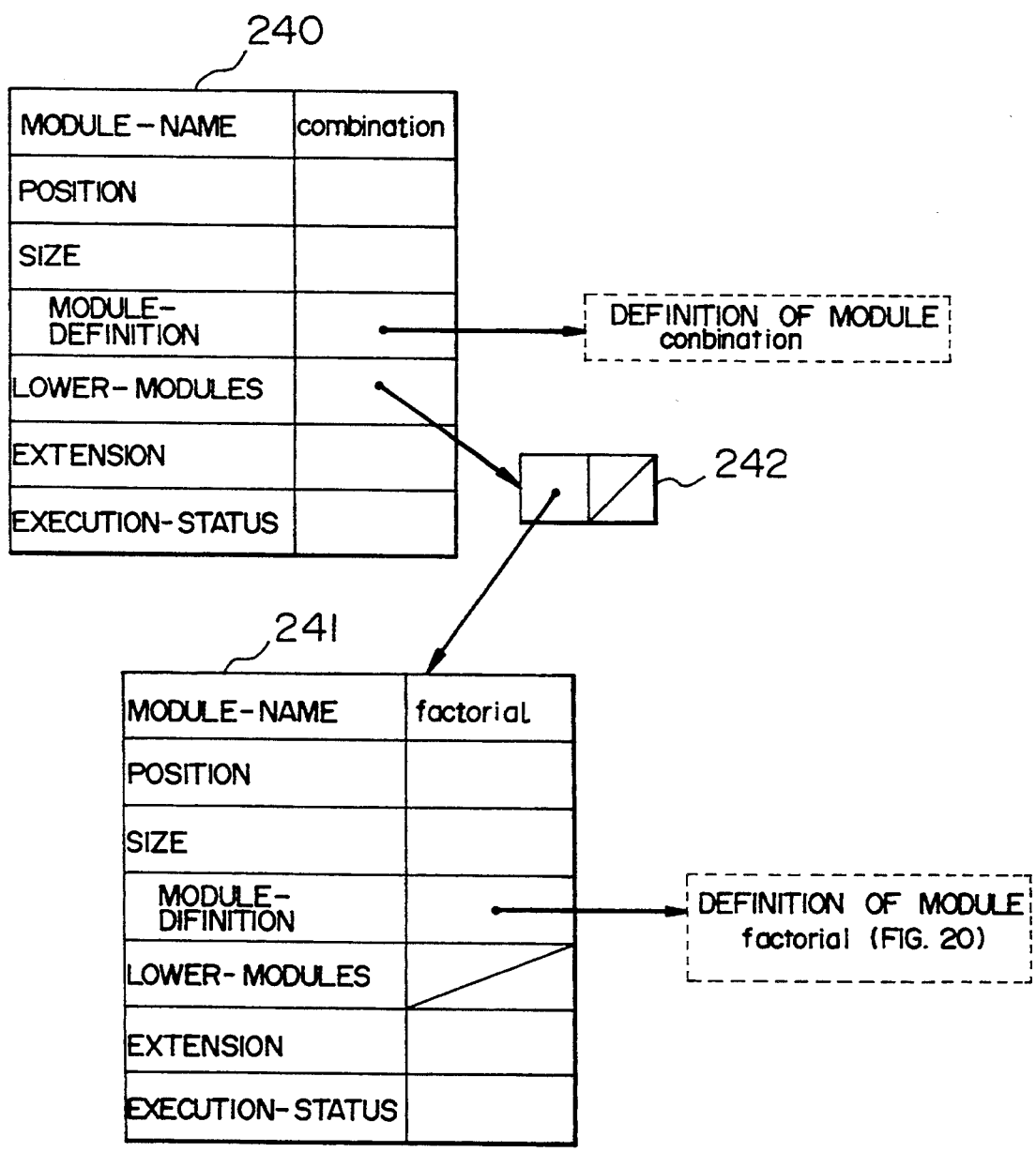
FIG. 24 is a diagram illustrating an example of data for internal expression of a module relation diagram.

FIG. 24 shows an example of data structure for internal expression data (7 in FIG. 2) of the module relation diagram created by the above procedure. This is an example created for the foregoing function "combination" and forms a list in a tree structure having information related to respective modules as the unit.

In FIG. 24, reference numerals 240 and 241 designate data for expressing function modules (hereinafter called the module cell). The module cell is comprised of slots named module-name, position, size, module-definition, lower-modules, extension, execution-status and so on.

Figure 25:
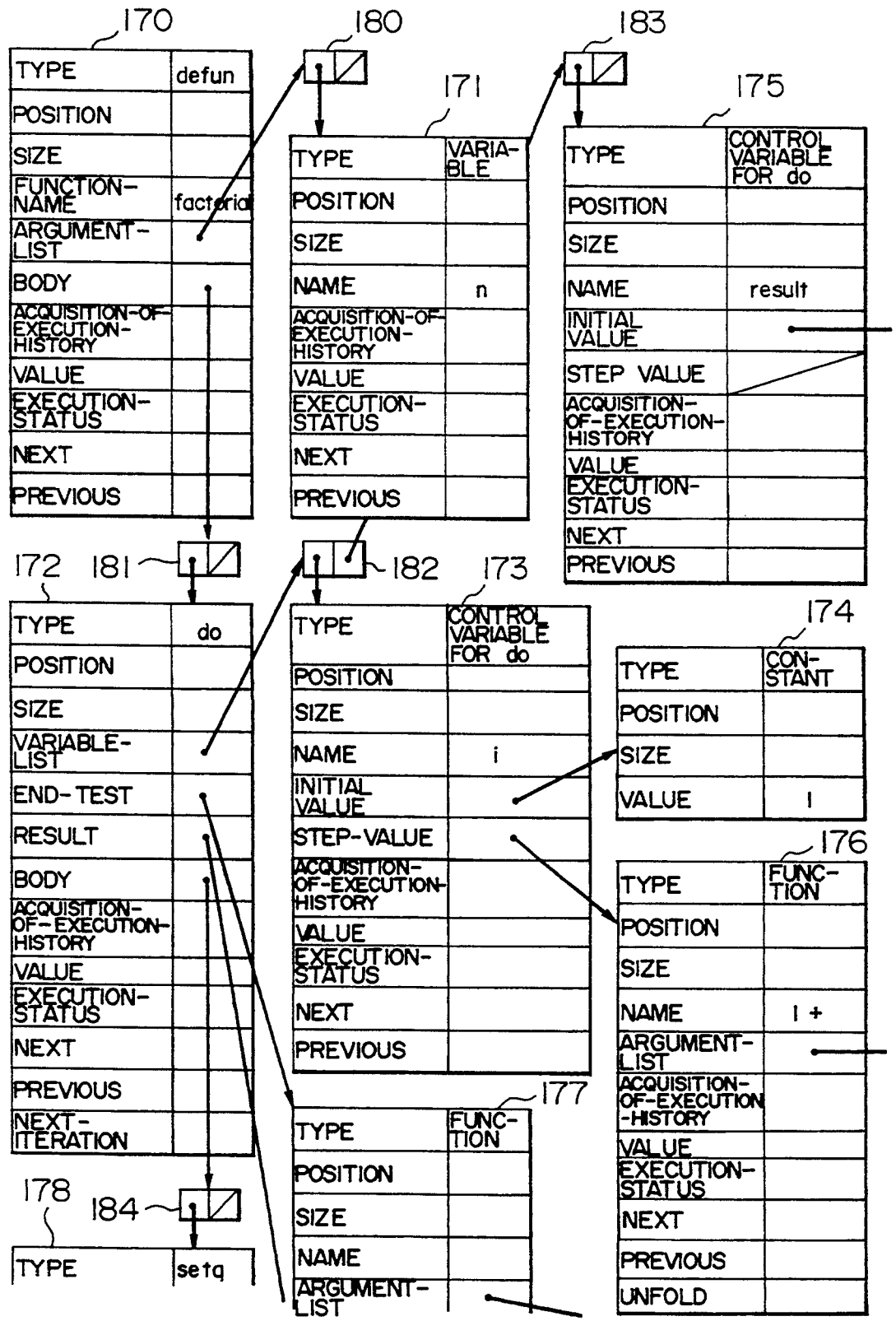
FIG. 25 is a diagram illustrating an example of data for internal expression of a source program in visual expression.

The slot module-definition is tied to data related to the specific definition, that is, data as shown in FIG. 25, later referred to. The slot lower-modules is connected to module cells following the concerned module. A lower module (as is also called "lower modules") is generally comprised of a plurality of cells. Reference numeral 242 in FIG. 24 designates data for tying a plurality of cells to form a single cell.

The slots position and size respectively hold data indicative of a position at which the module name is displayed and data indicative of a display size (occupied size) of the module name.

The slots extension and execution-status are used for preserving an execution display of a program and an execution history, later referred to.

FIG. 24 shows data related to a module relation diagram when a program is not executed, and differs from FIG. 15B in that a function module "combination" is connected only to a single function module "factorial". Also, while FIG. 24 is a very simple example, an actual module relation diagram forms a tree structure including multiple modules in a complicated hierarchy.

Next, description will be made as to a display of a visually expressed source program (step 202 in FIG. 22).

Since this method is described in detail in copending U.S. Patent application Ser. No. 665,563 filed on Mar. 6, 1991, minute procedures will be omitted herein. Briefly explaining, a source program in textual expression (1 in FIG. 2) is first analyzed to create a data structure (corresponding to 3 in FIG. 2) shown in FIG. 25. Next, an actual program in visual expression is displayed on the screen based on this data. In this event, the former half of the processing is executed by the program 2 for transforming a textual expression to a visual expression of FIG. 2, and the latter half by the display control program 4 of FIG. 2.

FIG. 25 shows part of internal expression data corresponding to the visual expression for the function "factorial" shown in FIG. 8. Reference numerals 170 178 respectively designate internal data expressions (hereinafter called the cell) corresponding to figures representing "defun", the parameter n of "defun", the iteration form "do", the control variable "i" for "do", its initial value 1, the function "1+" for giving a step value to the control variable "i", the control variable "result" for "do", the function ">" for determining the termination of iterations performed by "do", and the special function "setq" of the "do" body, all shown in FIG. 8.

Each cell commonly has slots type, position and size.

The slots position and size respectively hold information on a position and a size of a figure represented by the cell on the screen, specifically, coordinates value in two dimension and a size value.

The slot type indicates the type of a cell. A name stored therein determines the type of an attribute slot possessed by the cell and a role played by the cell. Cells "defun" (170), "do" (172), "setq" (178) and so on correspond to predetermined functions which perform special functions in a system. Function, variable and constant cells correspond to general function, variable and constant, respectively.

Each cell has a particular slot according to its type registered in the slot type. For example, the cell for "do" (172) has inherent slots named variable-list, endtest, result, body and so on. These slots correspond to the functions of "do" and each holds a pointer of the cell for a figure corresponding to each visual expression.

Cells except for that for a constant have slots acquisition-of-execution-history, value, next, previous and execution-status (the cell for a constant also has a slot value, however, a fixed value is stored therein upon generating the cell and cannot be changed afterward). The first four slots relate to an execution history acquisition (preservation) function, later referred to, while the last one execution-status relates to an execution display. The cell for "do" (172) has a slot next-iteration. This slot also relates to the execution history acquisition function.

Data 180–184 are used for slots which may have a plurality of elements, to tie these elements into one, similarly to data 242 in FIG. 24.

Referring back to FIG. 22, if the user enters an input at step 203, specifically, if the user selects an object on the module relation diagram or on a source program display window shown in FIG. 1, clicks a mouse on the button 23 of FIG. 1, or selects a command from the command menu as shown in FIG. 3, the flow proceeds to step 204 where the selection made by the user is interpreted and determined, and a processing corresponding thereto is executed.

Specifically, if the input is the "next" button clicked by the mouse, the flow proceeds to step 205 to execute a processing of the "next" button. This processing will be described later in greater detail.

If the input is the "go" button, the flow proceeds to step 206 to execute a processing of the "go" button. This processing will also be described later in greater detail.

If the input is the "prev" button, the flow proceeds to step 207 to execute a processing of the "prev" button. This processing will be described later in greater detail.

If the input is the "last" button, the flow proceeds to step 208 to execute a processing of the "last" button. This processing will be described later in greater detail.

If a command to set execution history acquisition to ON is inputted, the flow proceeds to step 209, where the "flag that specifies an execution history acquisition" (160 in FIG. 21) is set to ON. Contrarily, if a command to set execution history acquisition to OFF is inputted, the flow proceeds to step 210, where the same flag is set to OFF. If a command to set execution history limited acquisition mode is inputted, the flow proceeds to step 211, where the same flag is set to a limited acquisition mode.

If a command to set to ON the erasure of execution display when the processing terminates is inputted, the flow proceeds to step 212, where the "flag that specifies the erasure of execution display when the processing terminates" (161 in FIG. 21) is set to ON. Contrarily, if a command to set to OFF the erasure of execution display when the processing terminates is inputted, the flow proceeds to step 213, where the same flag is set to OFF.

If a command to set an execution status distinctive display to ON is inputted, the flow proceeds to step 214 (shown in FIG. 23 after this step), where the "flag that specifies to show execution status" (162 in FIG. 162) is set to ON. Contrarily, if a command to set an execution status distinctive display to OFF is inputted, the flow proceeds to step 215, where the same flag is set to OFF.

If a command to set the dynamically unfolding display of subprogram to ON is inputted, the flow proceeds to step 216, where the "flag that specifies the dynamically unfolding display of subprogram" (163 in FIG. 21) is set to ON. Contrarily, if a command to set a dynamically unfolding display of subprogram to OFF is inputted, the flow proceeds to step 217, where the same flag is set to OFF.

If a command to set a recursive piled-up display mode is inputted, the flow proceeds to step 218, where the "flag that specifies the display mode of recursive call" (164 in FIG. 21) is set to the piled-up display mode. If a command to set a recursive extension display mode is inputted, the flow proceeds to step 219, where the same flag is set to the extension display mode.

If the input is a selection of an object by the mouse cursor, the flow proceeds to step 220, where a displayed source program or an object to be displayed pointed by the mouse cursor on a module relation diagram is reversely displayed. The object to be displayed is also stored as a specified object.

If a command to set break point is inputted, the flow proceeds to step 221, where a position in an object selected by the object selection command on a source program or a module relation diagram is set and registered as a break point. If no object is selected in this event, no processing is executed.

If a command to release break point is inputted, the flow proceeds to step 222 to release a break point at a position in an object selected by the object selection command on a source program or a module relation diagram. If no object is selected in this event, no processing is executed. Also, if the object is not set as a break point, no processing is executed either.

If a command to specify an object for execution history acquisition is inputted, the flow proceeds to step 223, where the slot acquisition-of-execution-history of a previously selected object is set to ON. However, if no object has been previously selected, no processing is executed. If the input is a command to release an object specified for execution history acquisition, the flow proceeds to step 224, where the flag of the same slot is set to OFF. Also in this event, if no object has been selected, no processing is executed.

If a command to retrieve an execution history is inputted, the flow proceeds to step 225, where an execution history of a selected object is retrieved and displayed. However, if no object has been selected, no processing is executed. The processing of execution history retrieve and display will be described later in detail.

When the foregoing processings for the input have been terminated, the flow jumps to step 203 in FIG. 22 to wait for another input (step 226).

Next, processings for the "next" button, the "go" button, the "prev" button and the "last" button will be described in greater detail.

Figure 26:
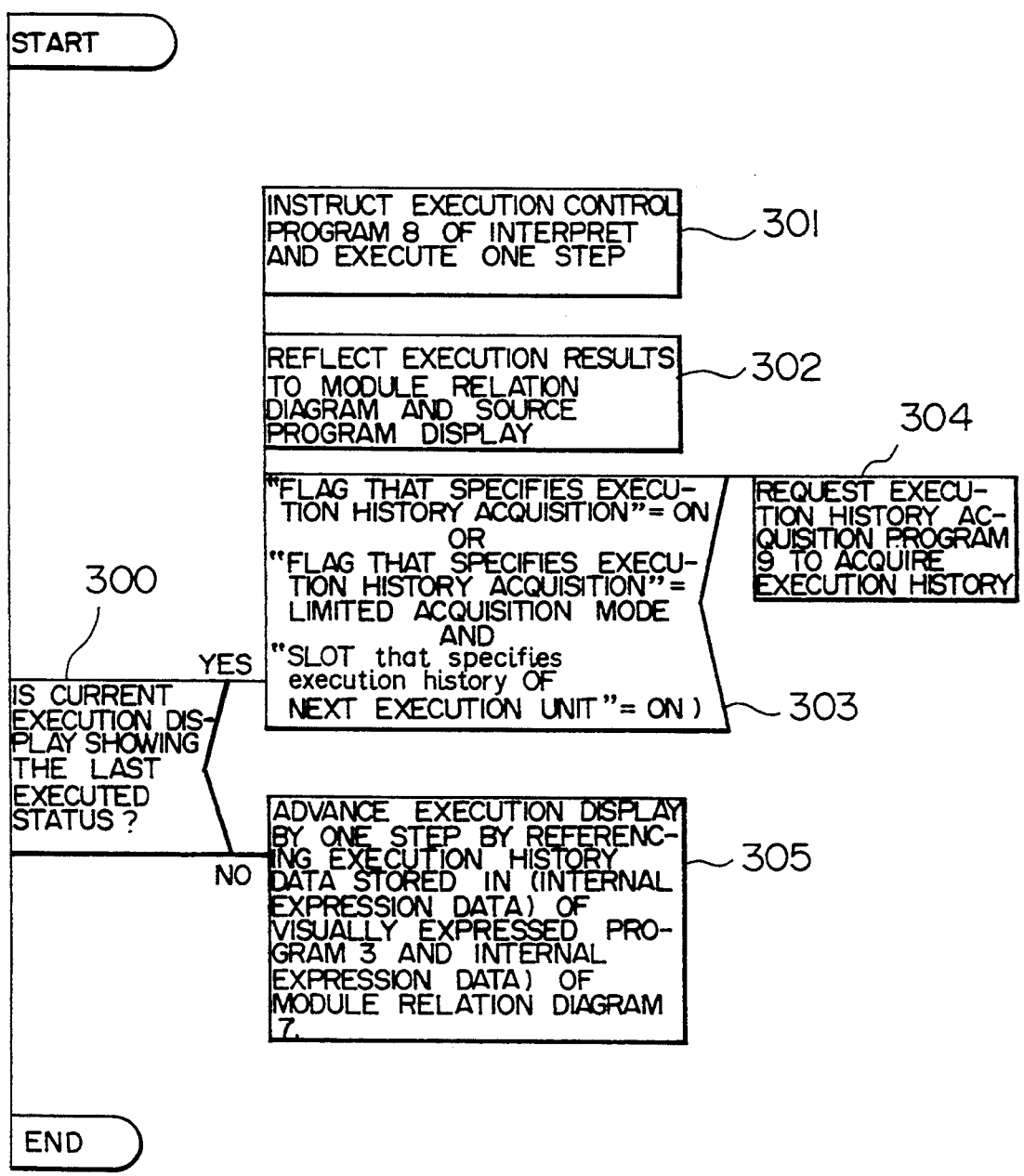

FIG. 26 illustrates a processing flow of the "next" button.

It is first determined at step 300 whether or not a module relation display or an execution display of a source program currently displayed on the screen shows an execution result obtained by the last executed execution unit by the "next" button, the "go" button or the like. This determination is provided for using the "next" button to perform two functions, i.e., start of a new execution and display of an execution history at the next step in an execution history retrieval. This determination is made by comparing the "unit which was executed last" 165 with the "unit which attracts attention now" 166.

If the displayed screen shows the last executed status (determined to be YES at step 300), the flow proceeds to step 301, where the execution control program 8 is instructed to interpret and execute one step of the visually expressed program. Then, this execution result is reflected to the window 21 of the module relation diagram and the window 22 of the source program at step 302. Also, hatching (indicating an execution unit to be next executed) on an execution terminated execution unit is released, and an execution unit to be next executed is newly hatched.

Afterward, it is determined at step 303 whether the foregoing "flag that specifies an execution history acquisition" is set to ON or whether a slot acquisition-of-execution-history is set to ON with the "flag that specifies an execution history acquisition" set to the limited acquisition mode. If this condition is satisfied, the flow proceeds to step 304, where the execution history acquisition program 9 is requested to write the value of the execution result of an execution unit (a return value of a function or the like) to a slot value of a concerned cell for the execution unit (see FIG. 25). In this event, a slot previous of that cell is tied to a cell for an execution unit which has been immediately previously executed. A slot next of the cell is also tied to a cell for a currently executed execution unit, such that when a retrieval of execution history is performed afterward, the execution history can be traced in either of the forward and backward directions.

If the execution unit executed as described above is in a variety of following statuses, a processing corresponding to each status is additionally executed.

First, suppose that the execution unit is the last one in a iteration description of the "do" or the like.

In this case, the flow returns to the start of the iteration and the first execution unit is to be executed. On the other hand, the display example of FIG. 9 shows that frames representing the iterations and partial programs included therein are piled up at the same positions for better understanding of the iteration operation. Then, at a timing of returning to the start, the partial program representing the iteration is newly piled up at the same position of the display. Simultaneously, if the "flag that specifies an execution history acquisition" is set to ON or a slot acquisition-of-execution-history of a cell corresponding to this iteration is set to ON, copies of the cell for this iteration and its descendants connected downward therefrom are made and tied to a slot next iteration of the cell for this iteration. This event is shown in FIG. 27.

Figure 27:
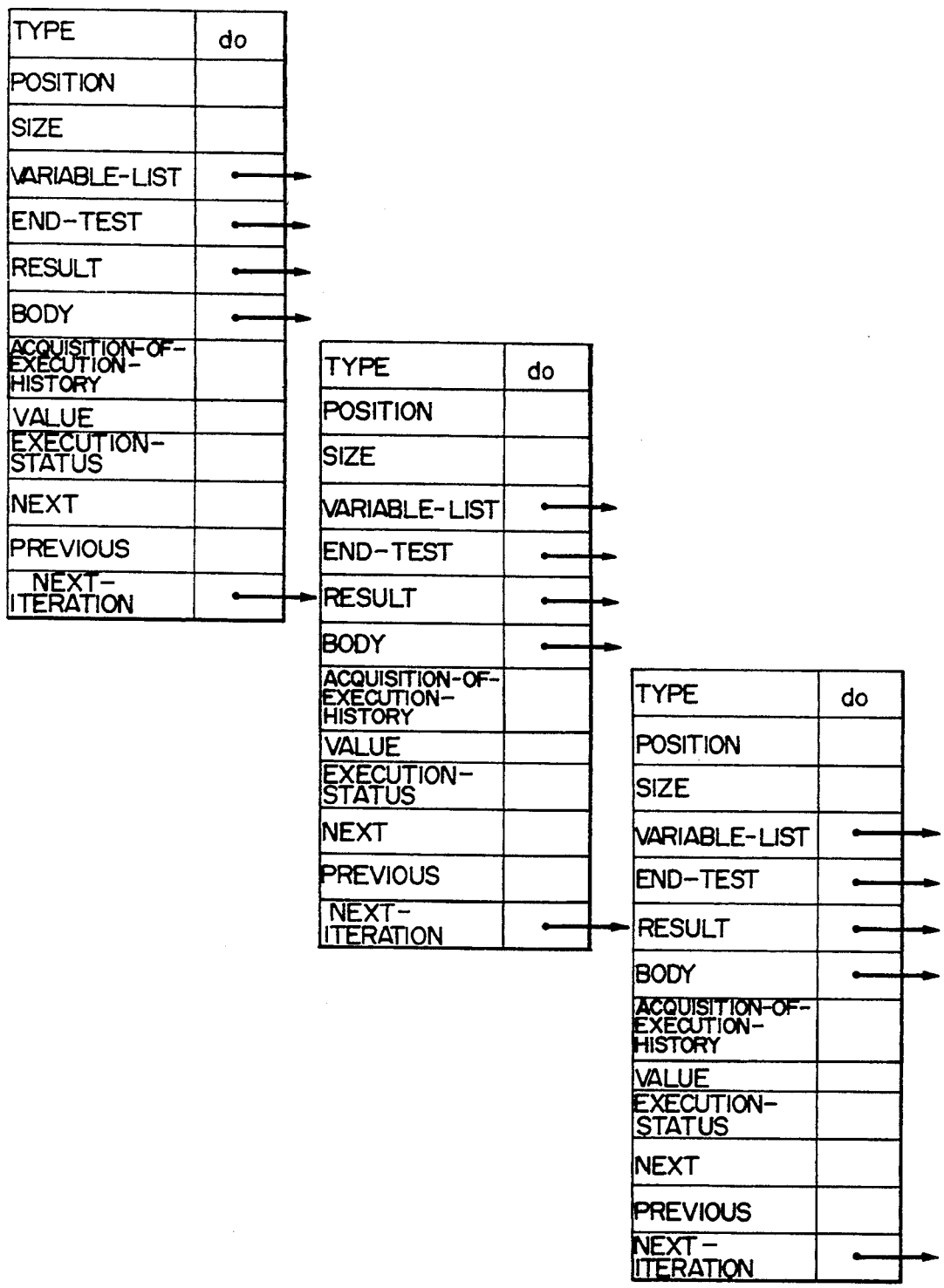
FIG. 27 is a diagram illustrating an example of data for internal expression of a piled-up display of an iteration form "do"

FIG. 27 shows internal expression data corresponding to the example of the program execution display shown in FIG. 9. Although there are only three cells illustrated in the drawing due to a lack of space, there should be actually five cells. Each cell for "do" corresponds to the program visual expression for the iteration of "do" expressed in the piled-up manner in FIG. 9.

Next, suppose that an executed execution unit is a user function call. In this case, if the "flag that specifies the dynamically unfolding display of subprogram" is ON, a slot extension of a cell corresponding to this function is tied to a tree of a cell corresponding to a visual expression indicating the function definition of a called user function, and then the whole program is again displayed. Thus, a display as shown in FIG. 13C is obtained. A cell tree or (part of) internal expression data corresponding to FIG. 13C is shown in FIG. 28.

Figure 28:
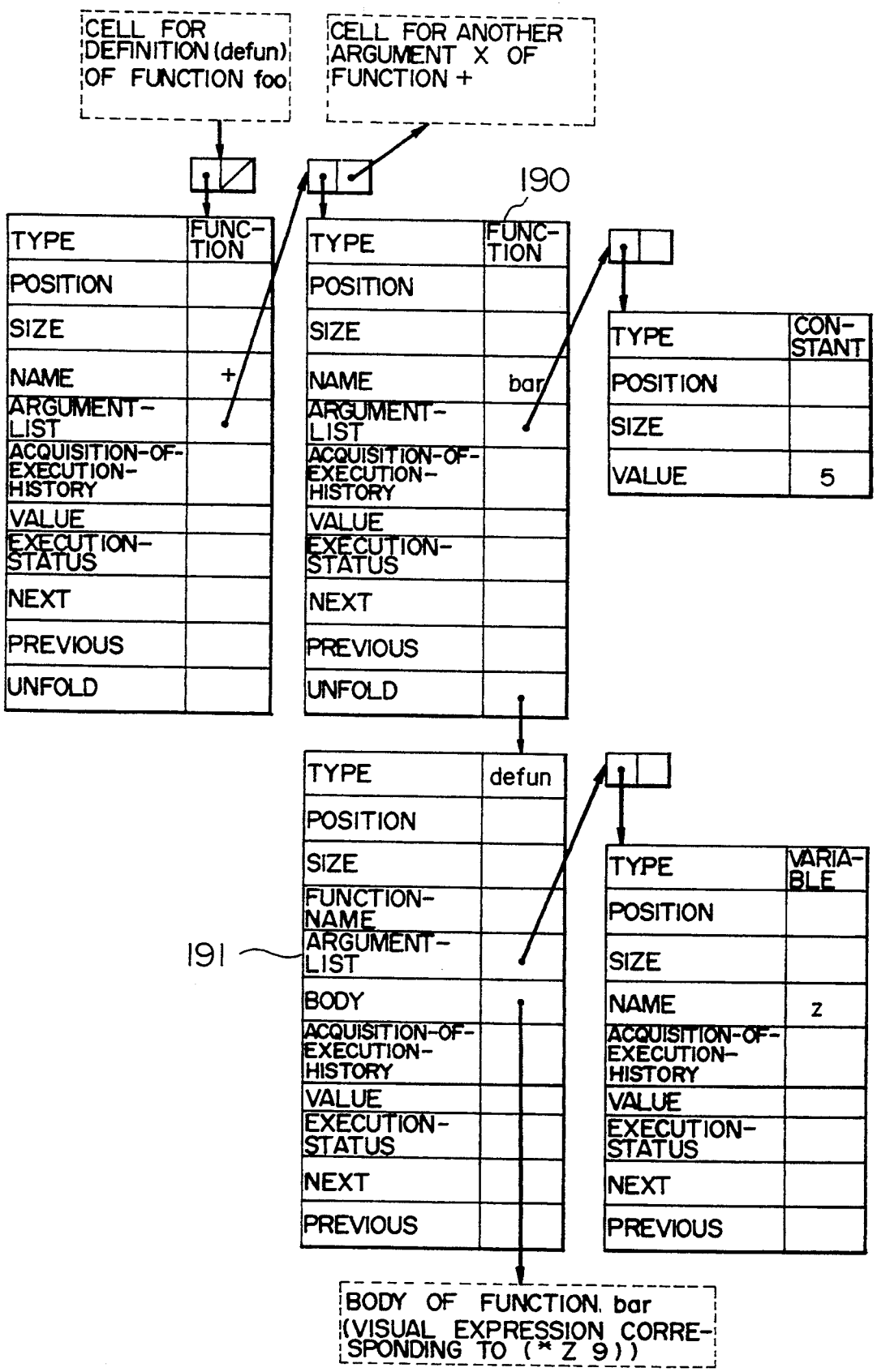
FIG. 28 is a diagram illustrating an example of data for internal expression of a dynamic unfolding display.

In FIG. 28, a slot extension of a cell 190 for a function "bar" is tied to a cell tree (a part below cell 191) in visual expression corresponding to the definition of the function "bar".

It should be noted herein that although the cell (190) corresponding to this function call is left on the cell tree, a figure corresponding to this cell is not displayed on the screen, and figures represented by the cells (below 191) tied to the slot extension of this cell is displayed. When a processing of the called user function has all been completed and the control returns to the calling cell, the cell tree of the function definition of the user function is removed from the slot extension, and then the display is again executed. At this time, a figure representing the original function call is naturally recovered instead of the visual expression for the definition of the called function.

Incidentally, upon executing this function call or upon completing the processing of the called function, the display on the module relation diagram, specifically, the hatching indicative of a function under execution is released, and the called function is newly hatched.

Besides the foregoing, the execution display by a visually expressed program includes that of a conditional branch described in connection with FIG. 10, that of a particular function of the LISP language "mapcar" described in connection with FIGS. 11B and 12, and so on, which can be readily realized by using a method analogous to those so far described.

As to a display of a module relation diagram, if a concerned function call is a direct or indirect recursive call, the following processing is further executed. Incidentally, the following procedure may be used to determine whether or not a call is recursive. When programs are called from higher one to lower one in order during executing the programs, the names of the respective programs are preserved. When the name of a newly called program exists in a list of the names of the preserved programs, this is determined to be a recursive call.

When a recursive call is to be executed, a recursive display mode flag is first checked. If this flag is set to a piled-up mode, a piled-up display as shown in FIG. 14C is performed. When the module B is called during executing the module D in FIG. 14A, part of the module relation diagram below the module B is superimposed on the same position as shown in FIG. 14C. This is performed by utilizing slots extension of the cells (240 and 241) for the respective modules. An internal data expression for the module relation diagram of FIG. 14C is shown in FIG. 29.

Figure 29:
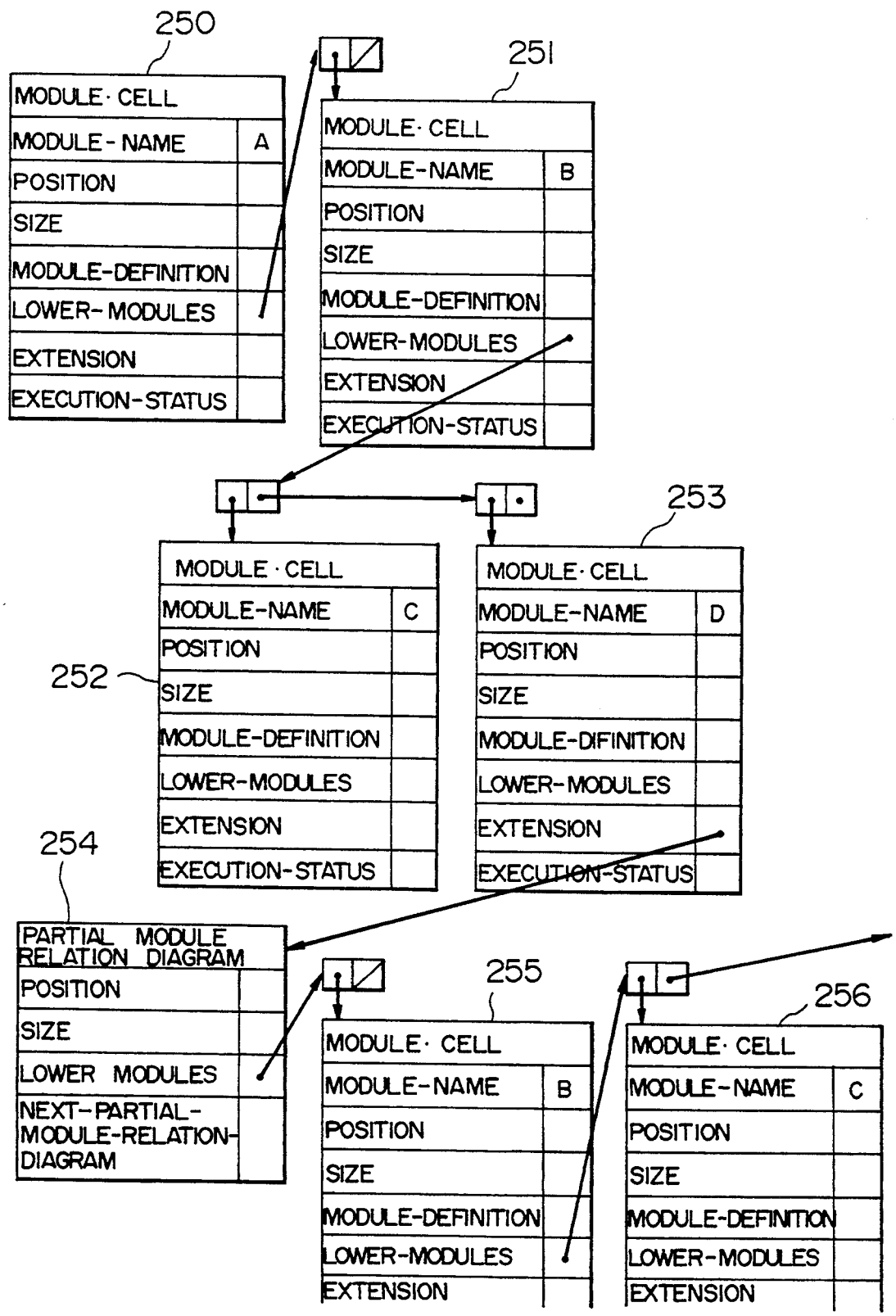
FIG. 29 is a diagram illustrating an example of data for internal expression of a module relation diagram displayed in a piled-up manner.

Referring now to FIG. 29, reference numerals 250–253 designate cells corresponding to respective modules in a module relation diagram in a static display status. Reference numerals 254–256 designates cells corresponding to parts of the module relation diagram which are displayed in a piled-up manner. Particularly, the cell 254 corresponds to the FIG. 131 in FIG. 14C, that is, the figure which serves as a base on which the parts of the module relation diagram are piled up. A slot lower modules of the cell 254 is tied to the actual partial module relation diagram (in this case, a tree including modules below the module B). When a recursive call is executed multiple times, the cell for this part of the module relation diagram and the part extending downward are tied, as a unit, to a slot next-partial-module-relation-diagram of this cell.

The above-mentioned is an example of an indirect recursive call. When a direct recursive call, in which a recursive call directly calls the calling module itself, is to be executed, a copied module cell may be directly tied to a slot extension of the original module cell without using the cell 254 of FIG. 29. The module relation diagram shown in FIG. 18 is an example of a display corresponding to such internal expression data.

When a recursive call is to be executed with the recursive display mode flag set to an extension mode, the module relation diagram is extended below the module D. The internal expression data of this extended module relation diagram has the structure completely identical to that of the recursion, as shown in FIG. 29. This differs from the recursion in displayed positions of respective modules in the extended module relation diagram, that is, the contents of slots position of respective module cells, and so on.

This method of displaying a module relation diagram by extending downward may be utilized in a program in which a calling module is dynamically determined.

When execution processings for the above-mentioned programs are in progress, if the "flag that specifies to show execution status" 162 is ON, the following processing is further performed additionally.

When an execution unit related to the above execution processings becomes an executing, executed or suspended status in the next step, this information is written into a slot execution status of a cell for the concerned execution unit. For the module relation diagram, when the execution status has changed, information on the change (executing, executed or suspended) is written into a slot execution status of a concerned module cell in a similar manner. Simultaneously, this information is reflected to a source program and a module relation diagram displayed on the screen.

Although above explanation did not refer to a processing related to the "flag that specifies the erasure of execution display when the processing terminates" in detail, it is assumed that a predetermined processing is executed appropriately at a necessary time. This will be applied also to the following description of processings.

Turning back to FIG. 26, if the answer at step 300 is NO, that is, if the "next" button is clicked as an input when the execution display has been returned to a status before the last status by the "prev" button or the like, the program is not interpreted or executed. Instead, by referencing execution history data previously stored in the visually expressed program 3 and the internal expression data of the module relation diagram 7, the current display of the visually expressed program and the module relation diagram is advanced by one step. Specifically, contents of a slot next of a cell for the "unit which attracts attention now" are referenced to display contents of a slot value of a cell specified by that value. Also, contents of the "unit which attracts attention now" is updated to that cell.

During this display change, if the "unit which attracts attention now" indicates the last execution unit in an iteration description, a partial program instructing an iteration is newly piled up at the same position, similarly to the foregoing display change by execution results.

Similarly, when a function call is to be executed, an additional display change processing is performed such as a dynamically unfolding display of modules, a change in the display of the module relation diagram, and so on.

Next, a processing for the "go" button will be described.

Figure 30:
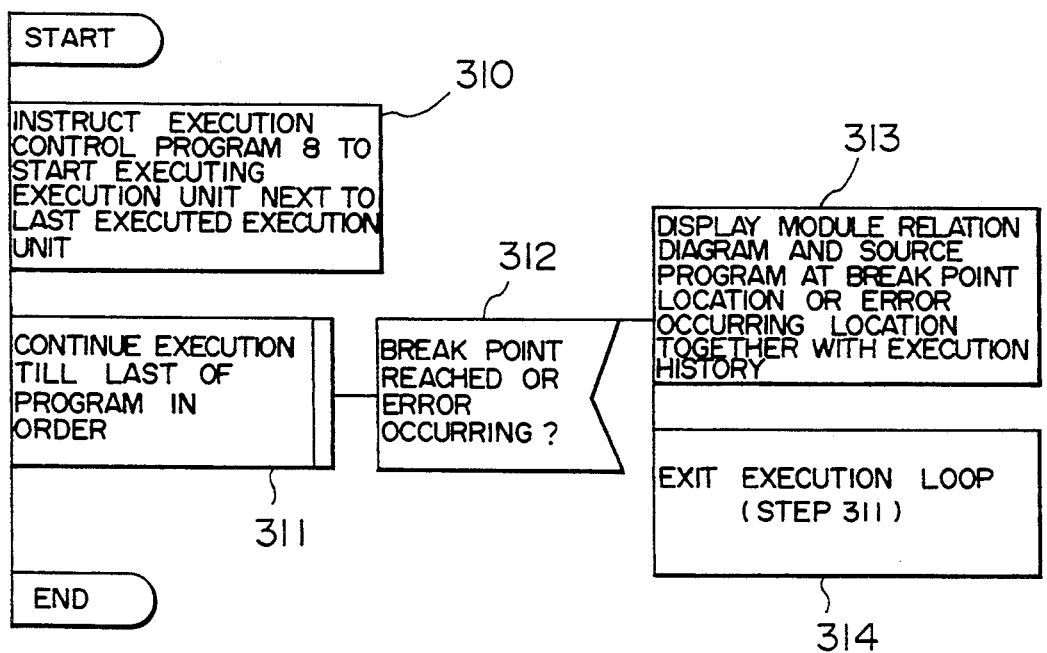
FIG. 30 is a flow diagram illustrating a processing flow of a "go" button.

FIG. 30 illustrates a processing flow of the "go" button. First, the execution control program 8 is instructed at step 310 to start execution next to the execution unit which was last executed. However, the execution is not interrupted at the next step but automatically continues until a previously specified break point (a point at which the program execution is interrupted) is found, an error occurs in course of the execution, or the last of the program is reached (see steps 311 and 312). In this event, if the "flag that specifies an execution history acquisition" is set to ON, or if a slot acquisition-of-execution-history of the execution unit to be next executed is set to ON with the "flag that specifies an execution history acquisition" set to a limited acquisition mode, the execution history acquisition program 9 is utilized to perform a variety of processings related to the execution history acquisition together with the execution processing of each execution unit, similarly to the processing of the "next" button.

When a break point is reached during an automatic execution, or when an error occurs during execution (step 312), a module relation diagram clearly indicating the location of the break point or the error occurring location is displayed together with so far stored execution history data (step 313). When no execution history data is stored, a module relation diagram illustrating a source program of a module for clearly indicating the break point location or the error occurring location and this module are only displayed. Afterward, the flow exits a execution loop from step 311 (step 314).

Although it was supposed in the foregoing explanation to start the execution from an execution unit next to the "execution unit which was last executed", this supposition is not indispensable. Alternatively, the execution may be started from an execution unit next to the "unit which attracts attention now". In this case, there are two methods: a method of simply tracing the so far stored execution history without executing a program portion from the "unit which attracts attention now" to the "execution unit which was last executed"; and a method of cancelling the so far stored execution history and newly starting the execution. The former method can generally speed the processing until the "execution unit which was last executed" since it does not directly perform the execution. It should be noted that processings such as a check of the presence or the absence of midway break points are performed also for this case. The latter method is effective for the case where related programs, data and so on have been changed before resuming the execution of the program and for the case where so far stored execution history may become invalid.

Next, a processing of the "prev" button will be described.

Briefly, this is a processing performed in the direction reverse to that of the "next" button. An execution display of a module relation diagram and a source program is returned by one step. Specifically, an execution display related to a "unit which attracts attention now" is erased, a slot previous of a cell for the "unit which attracts attention now" is traced, and the "unit which attracts attention now" is set to the immediately previous cell. In this event, a display of iterations, a dynamically unfolding display for a function, and a display of a module relation diagram should be properly corrected if necessary.

Incidentally, when no execution history data is preserved, a click on the "prev" button will not cause any processing.

Next, a processing of the "last" button will be described.

By referring to the "execution unit which was last executed", an execution display of a module relation diagram and a source program is returned to the last executed status. If the last executed status has already been displayed, no processing will be executed.

Next, a processing for an execution history retrieval and display will be described.

At a time when an object has been selected by a mouse cursor, the execution history retrieval program 10 is requested to retrieve execution history data corresponding to the selected object from the visually expressed program 3 or the module relation diagram 7 and display such data. Specifically, if a selected object is a module on the module relation diagram, its execution history is superimposed on a source program of the selected module. In this event, if a plurality of the same module are displayed in the piled-up or extension manner, the corresponding execution history is displayed at the position of the selected module.

When a selected object is one on a source program, the following processing is performed.

First, when a selected object is one of piled-up figures due to an iteration or a recursion, the object (visual expression for iteration or recursion) is brought to the top to allow the user to view the whole object.

When a selected object is a character string representing a variable, its value is displayed in the vicinity of the string. When a selected object is a box representing a function or an arrow representing an output of a function (return value), the value of the function is displayed at the position of the arrow representing the output. This operation is effective when the "flag that specifies the erasure of execution display when the processing terminates" is ON. If this flag is OFF, an execution history is wholly left and displayed on a source program, so that this operation, even if performed, is meaningless.

When an execution status of a program is displayed superimposed on a source program or the like, excessively large data (data requiring a large display region) will hinder the user from readily viewing the source program and understanding the execution status of the program, on the contrary. For such a case, countermeasures may be taken to restrict a display region for each data, or to display data requiring a large display region in the form of an icon such that the whole data can be seen if necessary. Alternatively, an execution unit may be selected by a click of a mouse on a figure representing the execution unit or in the vicinity thereof to display an execution display corresponding to the selected execution unit.

Although in all the foregoing explanation, visually expressed source programs have been employed, the present invention is not limited to such visually expressed programs but may be applicable to conventional textually expressed programs in the completely same manner. Examples of the present invention applied to textually expressed programs are shown in FIGS. 31, 32 and 33. Specifically, FIGS. 31, 32 and 33 illustrate examples which correspond to the display examples shown in FIG. 5, FIG. 9 and FIG. 12, respectively. Upwardly directed arrows (260, 270) in FIGS. 32 and 33 indicate execution units being executed (to be next executed).

The present invention can be applied not only to the visually expressed programs shown in the foregoing examples according to an expressing method described in co-pending U.S. Patent Application No. 665,563 but also to other visually expressed programs according to other methods.

Figures 34A, 34B:
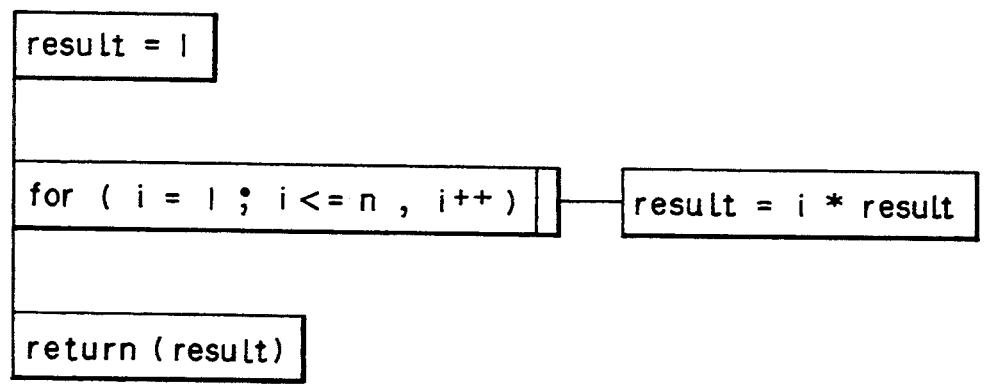
FIGS. 34A and 34B are diagrams showing an example of a program written in C language.

FIG. 34A is a program for a factorial function shown in FIG. 8 described in the programming language C, while FIG. 34B illustrates the program of FIG. 34A in a known PAD. Note, however, that the program in the PAD expression omits a function call definition portion (the first line in FIG. 34A) and a variable declaration portion (the second and fourth lines in FIG. 34A) included in the original program.

Figure 35:
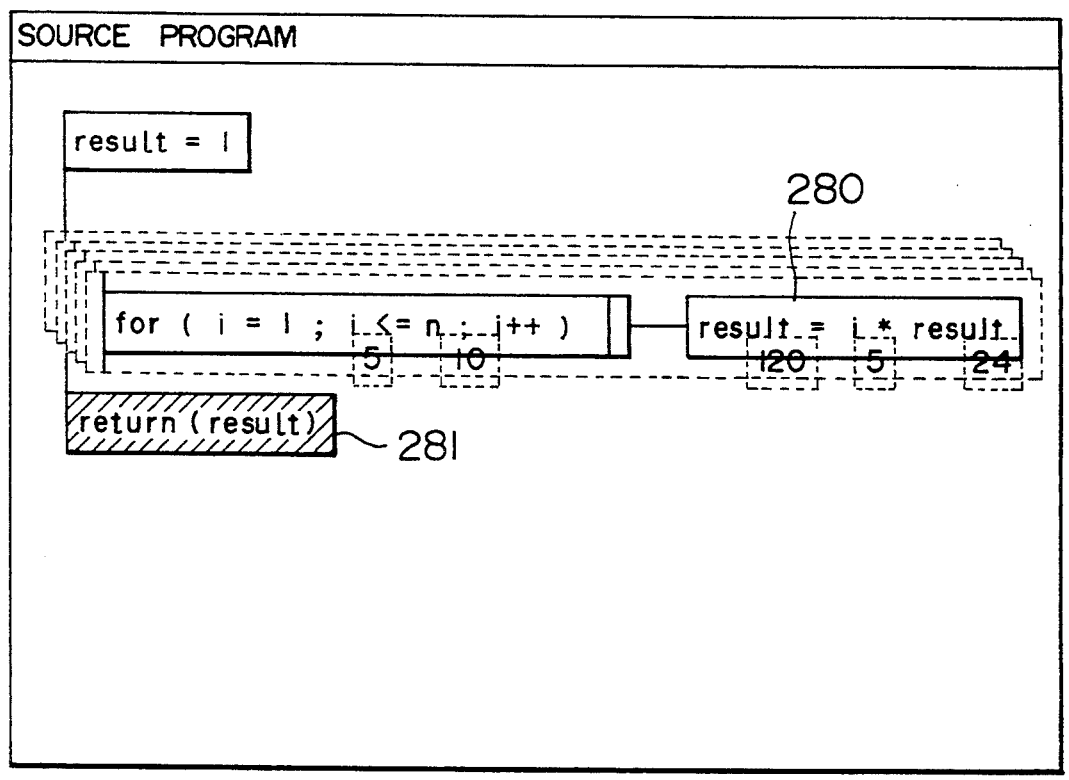
FIG. 35 is a diagram illustrating an example of an example of the program execution display method according to the present invention which is applied to a visually expressed program according to a known PAD (Problem Analysis Diagram)

FIG. 35 illustrates an example of displaying the operation of the program shown in FIG. 34B superimposed on its PAD expression. Similarly to the example shown in FIG. 8, FIG. 35 shows a midway result where an argument n has been given a value 10, a function "factorial" has been called and executed with an variable "i" changed from 1 to 5. A superimposed display of the variable values and a piled-up display of iterations will permit the user to understand an execution status of the program. The drawing shows a status where the program has been executed up to a portion indicated by a box 280 and a box 281 is to be next executed. To visually express a portion to be next executed, the box 281 is hatched.

In the display examples so far used for the explanations, the module relation diagrams and source programs have been basically drawn in two-dimensional plane (although the piled-up displays for iterative and recursive calls may be called pseudo three-dimensional expressions). If these figures are drawn in a plane in the three-dimensional space by using a display unit capable of three-dimensional graphics display, the above-mentioned piled-up displays for iterative and recursive calls can be truly solidly expressed, which will further promote the understanding of program execution through visual images.

Although in the foregoing explanations, the examples of programs have been mainly written in the LISP language, the present invention is not limited to programs written in the LISP language and visual expressions thereof but is applicable to execution displays for other programming languages, for example, procedure oriented languages such as FORTRAN, PL/I, C, PASCAL and ADA and visual expressions thereof, and knowledge processing language such as Prolog and rule descriptions.

It will be apparent that the present invention is further applicable not only to visually expressed programs transformed from textually expressed programs but also to programs written in a programming language having visual expressions as a sole expression form.

The display attribute for a distinctive display is not limited to the thickness of line and hatching, and a variety of methods can be taken, for example, color and shape of lines (broken line, one-dot chain line and so on), shape of figure (circle, ellipse, rectangle with rounded corners and so on in addition to a simple rectangle), shape of edges (shape of edge lines, coloring of portions only near edges), filling the inside of a closed figure with a color, and so on.

As described above, according to the present invention, execution of a program can be monitored on a source program or a module relation diagram. Particularly, since a program including iterative or recursive calls is displayed by means of a piled-up display in accordance with the structure of an execution process of the program, the user can understand the execution of the program as visual images and easily recognize the same. Also, a clear execution display method is provided also for a conditional branch, a function for executing the same processing to each of plural elements such as a "map" function of the LISP language, and so on, whereby the understanding of program execution will be remarkably promoted.

The present invention further provides a method of superimposing a display on a source program or a module relation diagram for preservation and retrieval of an execution history and retrieval results, in other words, a means for realizing an easy retrieval and clear display for the execution history. Particularly, since the present invention provides a program including iterative or recursive calls with a means for visually retrieving each unit of the iterative or recursive calls, retrieval and display of the execution history can be easily performed.

Incidentally, although the present invention can have effects with a program in textual expression to some extent, it will be understood also from the drawings shown as examples of program execution displays that larger effects are produced with a visually expressed program.

What is claimed is:

1. A method of displaying program execution for a computer system, comprising the steps of:
    displaying a source program on a single screen of a display unit;
    storing in memory, displayed positions on said screen of execution units of programs constituting said source program such as functions, equations or execution statements;
    referencing said stored positions each time said execution unit of said source program is executed to distinctively display the position of said execution unit on said screen; and
    displaying processing result of distinctively displayed values of parameters, arguments or variables, or processing results such as return values of functions relative to said execution unit, referencing the information of said stored displayed position of said execution unit, in the vicinity of said execution unit distinctively displayed on said screen each time said execution unit of said source program is executed.

2. A method of displaying program execution for a computer system, comprising the steps of:
    displaying a source program on a single screen of a display unit;
    storing in memory, displayed positions on said screen of execution units of programs constituting said source program such as functions, equations or execution statements;
    displaying an execution status of said source program superimposed on the display of said source program on said screen; and
    when said source program iteratively executes the same execution unit a plurality of times or recursively calls the same execution unit a plurality of times, displaying said execution unit to be newly executed superimposed on a display of said executed execution unit each time said execution unit is executed.

3. A method of displaying program execution for a computer system, comprising the steps of:
    displaying a source program on a single screen of a display unit;
    storing in memory, displayed positions on said screen of execution units of programs constituting said source program such as functions, equations or execution statements;
    displaying an execution status of said source program on a display of said source program; and
    when said source program executes a series of execution units including a conditional branch, distinctively displaying on said screen an execution unit to be executed next to said conditional branch in accordance with the result of said conditional branch.

4. A method of displaying program execution for a computer system, comprising the steps of:
    displaying a source program on a single screen of a display unit;
    storing in memory, displayed positions on said screen of execution units of programs constituting said source program such as functions, equations or execution statements;
    when said source program includes a function or subroutine for iteratively executing the same processing for each of plural constituent elements of an array or a list handled as an input argument, displaying said input argument as an array of said constituent elements in the vicinity of (the argument of) said function or subroutine;
    distinctively displaying an element of said argument which is an object to be currently executed; and
    successively displaying the processing results of said elements in the vicinity of the processing results of said function or subroutine corresponding to said argument, each time the processing for said element has been completed.

5. A method of displaying program execution for a computer system, comprising the steps of:
    displaying a source program on a single screen of a display unit;
    storing in memory, displayed positions on said screen of execution units of programs constituting said source program such as functions, equations or execution statements; and
    each time a function call, a subroutine call or a macro call included in said source program is executed, unfolding and displaying on said screen the contents of the definition of the function call, the subroutine call or the macro call.

6. A method of displaying program ,execution for a computer system, comprising the steps of:
    displaying a source program on a single screen of a display unit;
    storing in memory, displayed positions on said screen of execution units of programs constituting, said source program such as functions, equations or execution statements; and
    displaying an execution unit currently under execution, an executed execution unit, a suspended execution unit by a function call, a subroutine call or a macro call, and an unexecuted execution unit so as to be distinguished from each other.

7. A display method according to claim 1, further comprising the step of erasing the values of said parameters, said arguments or said variables the said processing results such as said return values of functions each time said execution unit has been processed.

8. A display method according to claim 1, further comprising the steps of:
    storing in memory the execution status of a program, that is, a control flow, arguments, variables or processing results such as return values of functions accompanied with the displayed positions of said execution units; and
    returning the currently executed location of said source program to a location one step before, in response to an instruction from the outside of the computer system, to display the execution status of the location one step before on the screen.

9. A method of displaying program execution for a computer system, comprising the steps of:
displaying on a screen of a display unit a module relation diagram which expresses a calling relationship among modules constituting a program in a tree structure;
storing in memory displayed positions of display data constituting said displayed module relation diagram on said screen;
distinctively displaying a module being currently executed on said module relation diagram; and
when the program includes a module which recursively calls the module itself or a higher module, displaying a partial module relation diagram including lower modules below the called module in a piled-up manner on said screen.

10. A method of displaying program execution for a computer system, comprising the steps of:
displaying on a screen of a display unit a module relation diagram which expresses a calling relationship among a plurality of modules constituting a program in a tree structure;
storing in memory displayed positions of display data constituting said displayed module relation diagram on said screen;
distinctively displaying a module being currently executed on said module relation diagram, and
when said module relation diagram includes a module which calls the same lower module plural and when said lower module called plural times is a module which is called by the same module calling description in an iteration description of an upper module, displaying a partial module relation diagram including lower modules from said called module in a piled-up manner on said display.

11. A display method according to claim 10, further comprising the step of, each time a module in said partial module relation diagram has been processed erasing said partial module relation diagram from the screen.

12. A method of displaying program execution for a computer system, comprising the steps of:
displaying on a screen of a display unit a module relation diagram which expresses a calling relationship among a plurality of modules constituting a program in a tree structure and a source program of a module to be currently executed;
displaying an execution status of each module in said module relation diagram and an execution status of said source program;
successively storing in memory an execution status of each execution unit of said source program, and corresponding relationship among displayed positions of said execution units on said screen and displayed positions of modules constituting said module relation diagram on said screen; and
returning an executed location of said source program and said module relation diagram to one step before a location being currently executed, in response to an instruction from the outside of the computer system, to display the execution status of said source program and said module relation diagram one step before.

13. A method of displaying program execution for a computer system, comprising the steps of:
displaying a source program on a single screen of a display unit;
storing in memory, displayed positions on said screen of execution units of programs constituting said source program such as functions, equations or execution statements;
storing in memory, the execution status of said program, that is, a control flow, arguments, variables or processing results such as return values of functions accompanied with the displayed positions of said execution units in conformity with execution of said source program;
retrieving, in response to a selection of an execution unit from the outside of the computer system, values of arguments, variables or return values of functions of said selected execution unit from data stored in said memory; and
displaying said retrieved values of arguments, variables or return values of functions in the vicinity of said specified execution unit.

14. A display method according to claim 13, further comprising the steps of:
when said source program includes an execution statement for iteratively executing the same execution unit plural times or recursively executing the same execution unit plural times
successively displaying the results of arguments, variables or return values of functions related to said execution unit on a partial program comprised of said execution statement each time said execution unit is processed;
each time an iteratively or recursively called execution unit is started, displaying a partial program including said called execution unit which is successively piled up on a previous partial program; and
in response to a selection of an execution unit in said partial programs displayed in a piled-up manner, superimposing the processing results of arguments, variables or return values of functions related to said selected execution unit on a partial program including said specified execution unit and displaying the same on the top of said piled-up display.

15. A display method according to claim 14, further comprising the steps of:
in response to a selection of an execution unit in said source program displayed on said screen from the outside, successively storing in memory an execution status of arguments, variables, or return values of functions of said selected execution unit, or in response to a selection of an execution unit related to an iterative or recursive call from the outside, successively storing in memory an execution status of arguments, variables, return values of functions related to said selected iterative or recursive call.

16. A method of displaying program execution for a computer system, comprising the steps of:
displaying on a screen of a display unit a module relation diagram which expresses a calling relationship among a plurality of modules constituting a program in a tree structure,
storing in memory, displayed positions on said screen of display data constituting said displayed module relation diagram;
storing in memory displayed positions on said screen of execution units of programs constituting source programs of said modules such as functions, equations or execution statements;
storing in memory the execution statuses of said program, that is, a control flow, arguments, variables or processing result such as return values of functions, accompanied with said stored displayed positions; and in response to a selection of a module from the outside of the computer system, retrieving said execution statuses from said data stored in memory displaying the source program of said selected module on said screen and displaying the execution status of said selected module superimposed on said source program on said screen.

17. A method of displaying program execution for a computer system, comprising the steps of:

displaying on a screen of a display unit, a module relation diagram which expresses a calling relationship among a plurality of modules constituting a program in a tree structure;

storing in memory, displayed positions on said screen of module display data of said displayed module relation diagram;

successively storing in memory, arguments or return values of functions during execution of said modules, accompanied with said stored displayed position, at each execution step of said source program; and in response to a selection of a module from the outside of the computer system, reading from said data stored in memory values of arguments, variables, or return values of functions of said selected module and displaying the same in the vicinity of said specified module.

18. A method of displaying program execution for a computer system, comprising the steps of:

displaying on a screen of a display unit a module relation diagram which expresses a calling relationship among a plurality of modules constituting a program in a tree structure:

storing in memory, displayed positions on said screen of module display data of said displayed module relation diagram;

storing in memory, displayed positions on said screen execution units of programs constituting source programs of said modules such as functions, equations or execution statements;

storing in memory, the execution statuses of ramp that is, a control flow, arguments, variables or processing results such as return values of functions accompanied with said stored displayed positions in conformity with execution of said source program;

when an error occurs in said source program or when execution of said program reaches a previously said program interrupting point, displaying said source program with an execution unit in which an error has occurred or with an execution unit including said interrupting point in a distinctive manner;

displaying said module relation diagram on which the module corresponding to said source program is distinctively displayed;

displaying on said displayed source program values of arguments, variables or processing results of functions related to said distinguished execution unit; and displaying said module relation diagram on which the module corresponding to said source program is distinctively displayed.

19. A display method according to claim 1, wherein said displayed source program is a program expressed in a diagram chart form.

20. A display method according to claim 3, wherein said displayed source program is a program expressed in a diagram chart form, and for distinguishing an execution unit to be executed next to said conditional branch in accordance with the result of said conditional branch, a line tying a series of execution units to be next executed is displayed as being thicker than other Lines.

21. A display method according to claim 2, wherein said displayed source program is a program expressed in a diagram chart form, and said piled-up display of execution units is expressed by shifting display layers of respective execution units.

22. A display method according to claim 2, wherein said displayed source program is a program expressed in a diagram chart form, and said piled-up display of execution unit is a solid expression having a height corresponding to the frequency of iterations of said execution unit.

23. A display method according to claim 22, wherein, beside said solid expression having a height corresponding to the frequency of iterations of said execution unit, a scale bar corresponding to the height is simultaneously displayed, and by specifying a position on said scale bar from the outside, arguments, variables and return values of functions corresponding to said specified position are superimposed on a partial program including said execution unit and displayed on the top of said solid expression.

24. A method of displaying program execution for a computer system, comprising the steps of:

displaying a source program in a single screen of a display unit;

storing in memory, displayed positions on said screen of execution units of programs constituting said displayed source program such as functions, equations or execution statements; and each time an execution unit of said source program is processed, successively displaying a display of said execution unit replaced with the processing results of said execution unit by referencing said stored displayed positions of said execution units.

* * * * *

UNITED STATES PATENT AND TRADEMARK OFFICE
CERTIFICATE OF CORRECTION

PATENT NO. : 5,375,125
DATED : December 20, 1994
INVENTOR(S) : Yoshimitsu Oshima, et al.

It is certified that error appears in the above-indentified patent and that said Letters Patent is hereby corrected as shown below:

Claim 6, column 32, line 41, after "program" delete ",".

Claim 6, column 32, line 52, after "call" delete ",".

Claim 10, column 33, line 31, after "plural" insert --times,--.

Claim 14, column 34, line 24, after "times" insert --;--.

Claim 16, column 34, line 59, delete "," and substitute therefor --;--.

Claim 17, column 35, line 13, after "unit" delete ",".

Claim 18, column 35, line 44, delete "ramp" and substitute therefor --ram--.

Claim 18, column 35, line 51, after "previously" delete "said" and substitute therefor --set--.

Claim 20, column 36, line 20, delete "Lines" and substitute therefor --lines--.

Signed and Sealed this

Twenty-first Day of February, 1995

Attest:

BRUCE LEHMAN

*Attesting Officer*     *Commissioner of Patents and Trademarks*